US009026938B2

(12) United States Patent
Carlisle et al.

(10) Patent No.: US 9,026,938 B2
(45) Date of Patent: May 5, 2015

(54) DYNAMIC DETAIL-IN-CONTEXT USER INTERFACE FOR APPLICATION ACCESS AND CONTENT ACCESS ON ELECTRONIC DISPLAYS

(75) Inventors: Andrew Carlisle, Vancouver (CA); Jamie Chong, Surrey (CA); Michael Doyle, Vancouver (CA); Keith Ippel, Richmond (CA); Zeenat Jetha, N. Vancouver (CA); Robert Komar, Vancouver (CA); Catherine Montagnese, Vancouver (CA); Chloe Morrow, Vancouver (CA); Vincent Ting, Vancouver (CA); David J. P. Baar, Vancouver (CA)

(73) Assignee: Noregin Assets N.V., L.L.C., Dover, DE (US)

( * ) Notice: Subject to any disclaimer, the term of this patent is extended or adjusted under 35 U.S.C. 154(b) by 915 days.

(21) Appl. No.: 12/178,679

(22) Filed: Jul. 24, 2008

(65) Prior Publication Data
US 2009/0172587 A1 Jul. 2, 2009

Related U.S. Application Data

(60) Provisional application No. 60/952,110, filed on Jul. 26, 2007.

(51) Int. Cl.
*G06F 3/00* (2006.01)
*G06F 3/0482* (2013.01)

(52) U.S. Cl.
CPC .... *G06F 3/0482* (2013.01); *G06F 2203/04806* (2013.01); *H04M 2250/22* (2013.01)

(58) Field of Classification Search
USPC .................. 715/765, 782, 783, 790, 793–800
See application file for complete search history.

(56) References Cited

U.S. PATENT DOCUMENTS 3,201,546 A 8/1965 Richardson
3,704,938 A 12/1972 Fanselow
(Continued)

FOREIGN PATENT DOCUMENTS

CA 2350342 11/2002
CA 2386560 11/2003
(Continued)

OTHER PUBLICATIONS

"Advisory Action", U.S. Appl. No. 11/673,038, (Mar. 25, 2010), 3 pages.
(Continued)

*Primary Examiner* — Amy Ng
*Assistant Examiner* — Meseker Takele
(74) *Attorney, Agent, or Firm* — McAndrews, Held & Malloy, Ltd.

(57) ABSTRACT

A method for presenting applications on a display screen, comprising: displaying a first presentation on the display screen, the first presentation including two or more icons; receiving a signal indicative of an icon, the icon being one of the two or more icons, the icon having an application associated therewith; initiating the application, the application having information associated therewith; generating a second presentation, the second presentation having a first area for presenting the information at least partially surrounded by a second area for presenting reduced-size versions of the two or more icons other than the icon; and, displaying the second presentation on the display screen to replace display of the first presentation.

24 Claims, 7 Drawing Sheets

(56) References Cited

U.S. PATENT DOCUMENTS

| | | | |
|---|---|---|---|
| 3,739,739 A | 6/1973 | Brase | |
| 3,762,799 A | 10/1973 | Shapiro | |
| 4,581,647 A | 4/1986 | Vye | |
| 4,630,110 A | 12/1986 | Cotton et al. | |
| 4,688,181 A | 8/1987 | Cottrell et al. | |
| 4,757,616 A | 7/1988 | Hills | |
| 4,790,028 A | 12/1988 | Ramage | |
| 4,800,379 A | 1/1989 | Yeomans | |
| 4,885,702 A | 12/1989 | Ohba | |
| 4,888,713 A | 12/1989 | Falk | |
| 4,970,028 A | 11/1990 | Kenyon et al. | |
| 4,985,849 A | 1/1991 | Hideaki | |
| 4,992,866 A | 2/1991 | Morgan | |
| 5,031,918 A | 7/1991 | Brill | |
| 5,048,077 A | 9/1991 | Wells et al. | |
| 5,175,808 A | 12/1992 | Sayre | |
| 5,185,599 A | 2/1993 | Dorrnink et al. | |
| 5,185,667 A | 2/1993 | Zimmerman | |
| 5,200,818 A | 4/1993 | Neta et al. | |
| 5,206,721 A | 4/1993 | Ashida et al. | |
| 5,218,459 A * | 6/1993 | Parulski et al. | 358/451 |
| 5,227,771 A | 7/1993 | Kerr et al. | |
| 5,250,934 A | 10/1993 | Denber et al. | |
| 5,258,837 A | 11/1993 | Gormley | |
| 5,269,687 A | 12/1993 | Mott et al. | |
| 5,275,019 A | 1/1994 | Pagani | |
| 5,309,279 A | 5/1994 | Halstead | |
| 5,321,807 A | 6/1994 | Mumford | |
| 5,329,310 A | 7/1994 | Liljegren et al. | |
| 5,341,466 A | 8/1994 | Perlin et al. | |
| 5,369,527 A | 11/1994 | McCracken | |
| 5,416,900 A | 5/1995 | Blanchard et al. | |
| 5,432,895 A | 7/1995 | Myers | |
| 5,451,998 A | 9/1995 | Hamrick | |
| 5,459,488 A | 10/1995 | Geiser | |
| 5,473,740 A | 12/1995 | Kasson | |
| 5,521,634 A | 5/1996 | McGary | |
| 5,523,783 A | 6/1996 | Cho | |
| 5,528,289 A | 6/1996 | Cortjens et al. | |
| 5,539,534 A | 7/1996 | Hino et al. | |
| 5,581,670 A | 12/1996 | Bier et al. | |
| 5,583,977 A | 12/1996 | Seidl | |
| 5,588,098 A | 12/1996 | Chen et al. | |
| 5,594,859 A | 1/1997 | Palmer et al. | |
| 5,596,690 A | 1/1997 | Stone et al. | |
| 5,598,297 A | 1/1997 | Yamanaka et al. | |
| 5,610,653 A | 3/1997 | Abecassis | |
| 5,613,032 A | 3/1997 | Cruz et al. | |
| 5,638,523 A | 6/1997 | Mullet et al. | |
| 5,644,758 A | 7/1997 | Patrick | |
| 5,651,107 A | 7/1997 | Frank et al. | |
| 5,652,851 A | 7/1997 | Stone et al. | |
| 5,657,246 A | 8/1997 | Hogan et al. | |
| 5,670,984 A | 9/1997 | Robertson et al. | |
| 5,680,524 A | 10/1997 | Maples et al. | |
| 5,682,489 A | 10/1997 | Harrow et al. | |
| 5,689,287 A | 11/1997 | Mackinlay et al. | |
| 5,689,628 A | 11/1997 | Robertson | |
| 5,721,853 A | 2/1998 | Smith | |
| 5,729,673 A | 3/1998 | Cooper et al. | |
| 5,731,805 A | 3/1998 | Tognazzini et al. | |
| 5,742,272 A | 4/1998 | Kitamura et al. | |
| 5,745,166 A | 4/1998 | Rhodes et al. | |
| 5,751,289 A | 5/1998 | Myers | |
| 5,754,348 A | 5/1998 | Soohoo | |
| 5,764,139 A | 6/1998 | Nojima et al. | |
| 5,767,850 A * | 6/1998 | Ramanathan et al. | 715/797 |
| 5,786,814 A | 7/1998 | Moran et al. | |
| 5,798,752 A | 8/1998 | Buxton et al. | |
| 5,808,670 A | 9/1998 | Oyashiki et al. | |
| 5,812,111 A | 9/1998 | Fuji et al. | |
| 5,818,455 A | 10/1998 | Stone et al. | |
| 5,848,231 A | 12/1998 | Teitelbaum et al. | |
| 5,852,440 A | 12/1998 | Grossman et al. | |
| 5,859,639 A * | 1/1999 | Ebrahim | 715/788 |
| 5,872,922 A | 2/1999 | Hogan et al. | |
| 5,909,219 A | 6/1999 | Dye | |
| 5,923,364 A | 7/1999 | Rhodes et al. | |
| 5,926,209 A | 7/1999 | Glatt | |
| 5,949,430 A | 9/1999 | Robertson et al. | |
| 5,950,216 A | 9/1999 | Amro et al. | |
| 5,959,605 A | 9/1999 | Gilblom | |
| 5,969,706 A | 10/1999 | Tanimoto et al. | |
| 5,973,694 A | 10/1999 | Steele et al. | |
| 5,991,877 A | 11/1999 | Luckenbaugh | |
| 5,999,879 A | 12/1999 | Yano | |
| 6,005,611 A | 12/1999 | Gullichsen et al. | |
| 6,037,939 A | 3/2000 | Kashiwagi et al. | |
| 6,043,817 A * | 3/2000 | Bolnick et al. | 715/788 |
| 6,052,110 A | 4/2000 | Sciammarella et al. | |
| 6,057,842 A * | 5/2000 | Knowlton et al. | 715/788 |
| 6,057,844 A | 5/2000 | Strauss | |
| 6,064,401 A | 5/2000 | Holzman et al. | |
| 6,067,372 A | 5/2000 | Gur et al. | |
| 6,072,501 A | 6/2000 | Bier | |
| 6,073,036 A | 6/2000 | Heikkinen et al. | |
| 6,075,531 A | 6/2000 | DeStefano | |
| 6,081,277 A | 6/2000 | Kojima | |
| 6,084,598 A | 7/2000 | Chekerylla | |
| 6,091,771 A | 7/2000 | Seeley et al. | |
| 6,108,005 A | 8/2000 | Starks et al. | |
| 6,128,024 A | 10/2000 | Carver et al. | |
| 6,133,914 A | 10/2000 | Rogers et al. | |
| 6,147,709 A | 11/2000 | Martin et al. | |
| 6,154,840 A | 11/2000 | Pebley et al. | |
| 6,160,553 A | 12/2000 | Robertson et al. | |
| 6,184,859 B1 | 2/2001 | Kojima | |
| 6,198,484 B1 | 3/2001 | Kameyama | |
| 6,201,546 B1 | 3/2001 | Bodor et al. | |
| 6,201,548 B1 | 3/2001 | Cariffe et al. | |
| 6,204,845 B1 | 3/2001 | Bates et al. | |
| 6,204,850 B1 | 3/2001 | Green | |
| 6,215,491 B1 | 4/2001 | Gould | |
| 6,219,052 B1 | 4/2001 | Gould | |
| 6,241,609 B1 | 6/2001 | Rutgers | |
| 6,246,411 B1 | 6/2001 | Strauss | |
| 6,249,281 B1 | 6/2001 | Chen et al. | |
| 6,256,043 B1 | 7/2001 | Aho et al. | |
| 6,256,115 B1 | 7/2001 | Adler et al. | |
| 6,256,737 B1 | 7/2001 | Bianco et al. | |
| 6,266,082 B1 | 7/2001 | Yonezawa et al. | |
| 6,271,854 B1 | 8/2001 | Light | |
| 6,278,443 B1 | 8/2001 | Amro et al. | |
| 6,278,450 B1 | 8/2001 | Arcuri et al. | |
| 6,288,702 B1 | 9/2001 | Tachibana et al. | |
| 6,300,947 B1 * | 10/2001 | Kanevsky | 715/866 |
| 6,304,271 B1 | 10/2001 | Nehme | |
| 6,307,612 B1 | 10/2001 | Smith et al. | |
| 6,320,599 B1 | 11/2001 | Sciammarella et al. | |
| 6,337,709 B1 | 1/2002 | Yamaashi et al. | |
| 6,346,938 B1 | 2/2002 | Chan et al. | |
| 6,346,962 B1 | 2/2002 | Goodridge | |
| 6,359,615 B1 | 3/2002 | Singh | |
| 6,381,583 B1 | 4/2002 | Kenney | |
| 6,384,849 B1 | 5/2002 | Morcos et al. | |
| 6,392,661 B1 | 5/2002 | Tankersley | |
| 6,396,648 B1 | 5/2002 | Yamamoto et al. | |
| 6,396,962 B1 | 5/2002 | Haffey et al. | |
| 6,400,848 B1 | 6/2002 | Gallagher | |
| 6,407,747 B1 | 6/2002 | Chui et al. | |
| 6,411,274 B2 | 6/2002 | Watanabe et al. | |
| 6,416,186 B1 | 7/2002 | Nakamura | |
| 6,417,867 B1 | 7/2002 | Hallberg | |
| 6,438,576 B1 | 8/2002 | Huang et al. | |
| 6,487,497 B2 | 11/2002 | Khavakh et al. | |
| 6,491,585 B1 | 12/2002 | Miyamoto et al. | |
| 6,504,535 B1 | 1/2003 | Edmark | |
| 6,515,663 B1 | 2/2003 | Hung et al. | |
| 6,515,678 B1 | 2/2003 | Boger | |
| 6,522,341 B1 | 2/2003 | Nagata | |
| 6,523,024 B1 | 2/2003 | Yajima et al. | |
| 6,542,191 B1 | 4/2003 | Yonezawa | |
| 6,552,737 B1 | 4/2003 | Tanaka et al. | |
| 6,559,813 B1 | 5/2003 | DeLuca et al. | |

(56) References Cited

U.S. PATENT DOCUMENTS

| | | |
|---|---|---|
| 6,577,311 B1 | 6/2003 | Crosby et al. |
| 6,577,319 B1 | 6/2003 | Kashiwagi et al. |
| 6,584,237 B1 | 6/2003 | Abe |
| 6,590,568 B1 | 7/2003 | Astala et al. |
| 6,590,583 B2 | 7/2003 | Soohoo |
| 6,608,631 B1 | 8/2003 | Milliron |
| 6,612,930 B2 | 9/2003 | Kawagoe et al. |
| 6,631,205 B1 | 10/2003 | Melen et al. |
| 6,633,305 B1 | 10/2003 | Sarfield |
| 6,646,642 B1 * | 11/2003 | Kanetaka et al. ............. 345/473 |
| 6,668,177 B2 * | 12/2003 | Salmimaa et al. ............ 455/566 |
| 6,690,387 B2 | 2/2004 | Zimmerman et al. |
| 6,704,034 B1 * | 3/2004 | Rodriguez et al. ............ 715/860 |
| 6,720,971 B1 | 4/2004 | Yamamoto et al. |
| 6,721,655 B1 | 4/2004 | Utsumi |
| 6,727,910 B2 | 4/2004 | Tigges |
| 6,731,285 B2 | 5/2004 | Matchen |
| 6,731,315 B1 | 5/2004 | Ma et al. |
| 6,744,430 B1 | 6/2004 | Shimizu |
| 6,747,610 B1 | 6/2004 | Taima et al. |
| 6,747,611 B1 | 6/2004 | Budd et al. |
| 6,747,668 B2 * | 6/2004 | Tanizawa ...................... 345/660 |
| 6,760,020 B1 | 7/2004 | Uchiyama et al. |
| 6,768,497 B2 | 7/2004 | Baar et al. |
| 6,798,412 B2 | 9/2004 | Cowperthwaite |
| 6,833,843 B2 | 12/2004 | Mojaver et al. |
| 6,842,175 B1 | 1/2005 | Schmalstieg et al. |
| 6,874,126 B1 | 3/2005 | Lapidous |
| 6,882,755 B2 | 4/2005 | Silverstein et al. |
| 6,906,643 B2 | 6/2005 | Samadani et al. |
| 6,911,975 B2 | 6/2005 | Iizuka et al. |
| 6,919,921 B1 | 7/2005 | Morota et al. |
| 6,924,822 B2 | 8/2005 | Card et al. |
| 6,938,218 B1 | 8/2005 | Rosen |
| 6,956,590 B1 | 10/2005 | Barton et al. |
| 6,961,071 B2 | 11/2005 | Montagnese et al. |
| 6,972,771 B2 * | 12/2005 | Nakano et al. ................. 345/589 |
| 6,975,335 B2 * | 12/2005 | Watanabe ...................... 345/660 |
| 6,983,424 B1 * | 1/2006 | Dutta ............................ 715/800 |
| 6,985,865 B1 | 1/2006 | Packingham et al. |
| 7,038,680 B2 | 5/2006 | Pitkow |
| 7,055,095 B1 | 5/2006 | Anwar |
| 7,071,971 B2 | 7/2006 | Elberbaum |
| 7,084,886 B2 | 8/2006 | Jetha et al. |
| 7,088,364 B2 | 8/2006 | Lantin |
| 7,106,349 B2 | 9/2006 | Baar et al. |
| 7,133,054 B2 | 11/2006 | Aguera y Arcas |
| 7,134,092 B2 | 11/2006 | Fung et al. |
| 7,158,878 B2 | 1/2007 | Rasmussen |
| 7,173,633 B2 | 2/2007 | Tigges |
| 7,173,636 B2 | 2/2007 | Montagnese |
| 7,194,697 B2 | 3/2007 | Sinclair, II et al. |
| 7,197,718 B1 | 3/2007 | Westerman et al. |
| 7,197,719 B2 | 3/2007 | Doyle et al. |
| 7,213,214 B2 | 5/2007 | Baar et al |
| 7,233,942 B2 | 6/2007 | Nye |
| 7,246,109 B1 | 7/2007 | Ramaswamy |
| 7,256,801 B2 | 8/2007 | Baar et al. |
| 7,274,381 B2 | 9/2007 | Mojaver et al. |
| 7,275,219 B2 | 9/2007 | Shoemaker |
| 7,280,105 B2 | 10/2007 | Cowperthwaite |
| 7,283,141 B2 * | 10/2007 | Baar et al. ..................... 345/647 |
| 7,310,619 B2 | 12/2007 | Baar et al. |
| 7,312,806 B2 | 12/2007 | Tigges |
| 7,321,824 B1 | 1/2008 | Nesbitt |
| 7,370,284 B2 * | 5/2008 | Andrea et al. ................. 715/788 |
| 7,411,610 B2 | 8/2008 | Doyle |
| 7,423,660 B2 | 9/2008 | Ouchi et al. |
| 7,443,396 B2 | 10/2008 | Ilic |
| 7,450,114 B2 | 11/2008 | Anwar |
| 7,472,354 B2 | 12/2008 | Jetha et al. |
| 7,486,302 B2 | 2/2009 | Shoemaker |
| 7,489,321 B2 | 2/2009 | Jetha et al. |
| 7,493,572 B2 | 2/2009 | Card et al. |
| 7,495,678 B2 | 2/2009 | Doyle et al. |
| 7,580,036 B2 | 8/2009 | Montagnese |
| 7,595,810 B2 * | 9/2009 | Louch ........................... 345/629 |
| 7,624,351 B2 * | 11/2009 | Unger et al. ................... 715/763 |
| 7,667,699 B2 | 2/2010 | Komar |
| 7,698,653 B2 | 4/2010 | Roman et al. |
| 7,714,859 B2 | 5/2010 | Shoemaker et al. |
| 7,737,976 B2 | 6/2010 | Lantin |
| 7,761,713 B2 | 7/2010 | Baar |
| 7,773,101 B2 | 8/2010 | Shoemaker |
| 7,844,917 B2 * | 11/2010 | Rigolet .......................... 715/798 |
| 7,917,179 B2 * | 3/2011 | Kokubo ......................... 455/566 |
| 8,040,360 B2 * | 10/2011 | Louch ........................... 345/629 |
| 8,106,927 B2 * | 1/2012 | Shoemaker et al. .......... 345/665 |
| 8,229,410 B2 * | 7/2012 | Horodezky et al. ........... 455/418 |
| 2001/0040585 A1 | 11/2001 | Hartford et al. |
| 2001/0040636 A1 | 11/2001 | Kato et al. |
| 2001/0048447 A1 | 12/2001 | Jogo |
| 2001/0055030 A1 | 12/2001 | Han |
| 2002/0033837 A1 | 3/2002 | Munro |
| 2002/0038257 A1 | 3/2002 | Joseph et al. |
| 2002/0044154 A1 | 4/2002 | Baar et al. |
| 2002/0062245 A1 | 5/2002 | Niu et al. |
| 2002/0075280 A1 | 6/2002 | Tigges |
| 2002/0087894 A1 | 7/2002 | Foley et al. |
| 2002/0089520 A1 | 7/2002 | Baar |
| 2002/0093567 A1 | 7/2002 | Cromer et al. |
| 2002/0101396 A1 | 8/2002 | Huston et al. |
| 2002/0122038 A1 | 9/2002 | Cowperthwaite |
| 2002/0135601 A1 | 9/2002 | Watanabe et al. |
| 2002/0143826 A1 | 10/2002 | Day et al. |
| 2002/0158908 A1 * | 10/2002 | Vaajala et al. ................. 345/767 |
| 2002/0171644 A1 | 11/2002 | Reshetov et al. |
| 2002/0180801 A1 | 12/2002 | Doyle et al. |
| 2003/0006995 A1 | 1/2003 | Smith et al. |
| 2003/0007006 A1 | 1/2003 | Baar et al. |
| 2003/0048447 A1 | 3/2003 | Harju et al. |
| 2003/0052896 A1 | 3/2003 | Higgins et al. |
| 2003/0052900 A1 | 3/2003 | Card et al. |
| 2003/0061211 A1 | 3/2003 | Shultz et al. |
| 2003/0076363 A1 | 4/2003 | Murphy |
| 2003/0100326 A1 | 5/2003 | Grube et al. |
| 2003/0103063 A1 | 6/2003 | Mojaver et al. |
| 2003/0105795 A1 | 6/2003 | Anderson et al. |
| 2003/0112503 A1 | 6/2003 | Lantin |
| 2003/0118223 A1 | 6/2003 | Rahn et al. |
| 2003/0137525 A1 | 7/2003 | Smith |
| 2003/0151625 A1 | 8/2003 | Shoemaker |
| 2003/0151626 A1 | 8/2003 | Komar et al. |
| 2003/0174146 A1 | 9/2003 | Kenoyer |
| 2003/0179198 A1 | 9/2003 | Uchiyama |
| 2003/0179219 A1 | 9/2003 | Nakano et al. |
| 2003/0179237 A1 * | 9/2003 | Nelson et al. ................. 345/765 |
| 2003/0196114 A1 | 10/2003 | Brew et al. |
| 2003/0210281 A1 | 11/2003 | Ellis et al. |
| 2003/0227556 A1 | 12/2003 | Doyle |
| 2003/0231177 A1 | 12/2003 | Montagnese et al. |
| 2004/0026521 A1 | 2/2004 | Colas et al. |
| 2004/0056869 A1 | 3/2004 | Jetha et al. |
| 2004/0056898 A1 | 3/2004 | Jetha et al. |
| 2004/0111332 A1 | 6/2004 | Baar et al. |
| 2004/0125138 A1 | 7/2004 | Jetha et al. |
| 2004/0150664 A1 | 8/2004 | Baudisch |
| 2004/0174398 A1 * | 9/2004 | Luke et al. .................... 345/856 |
| 2004/0194014 A1 | 9/2004 | Anwar |
| 2004/0217979 A1 | 11/2004 | Baar et al. |
| 2004/0240709 A1 | 12/2004 | Shoemaker |
| 2004/0257375 A1 | 12/2004 | Cowperthwaite |
| 2004/0257380 A1 | 12/2004 | Herbert et al. |
| 2005/0041046 A1 | 2/2005 | Baar et al. |
| 2005/0134610 A1 | 6/2005 | Doyle et al. |
| 2005/0259118 A1 | 11/2005 | Mojaver et al. |
| 2005/0278378 A1 | 12/2005 | Frank |
| 2005/0285861 A1 | 12/2005 | Fraser |
| 2006/0022955 A1 * | 2/2006 | Kennedy ....................... 345/173 |
| 2006/0026521 A1 | 2/2006 | Hotelling et al. |
| 2006/0033762 A1 | 2/2006 | Card et al. |
| 2006/0036629 A1 | 2/2006 | Gray |
| 2006/0059432 A1 | 3/2006 | Bells |
| 2006/0082901 A1 | 4/2006 | Shoemaker et al. |

(56) References Cited

U.S. PATENT DOCUMENTS

| | | | |
|---|---|---|---|
| 2006/0098028 | A1 | 5/2006 | Baar |
| 2006/0139375 | A1 | 6/2006 | Rasmussen et al. |
| 2006/0190833 | A1* | 8/2006 | SanGiovanni et al. ........ 715/767 |
| 2006/0192780 | A1 | 8/2006 | Lantin |
| 2006/0214951 | A1 | 9/2006 | Baar et al. |
| 2007/0033543 | A1 | 2/2007 | Ngari et al. |
| 2007/0064018 | A1 | 3/2007 | Shoemaker et al. |
| 2007/0097109 | A1 | 5/2007 | Shoemaker et al. |
| 2007/0247641 | A1* | 10/2007 | Okuma et al. ................. 358/1.1 |
| 2008/0059893 | A1* | 3/2008 | Byrne et al. ................... 715/757 |
| 2009/0100374 | A1* | 4/2009 | Sheasby et al. ............... 715/788 |
| 2009/0141044 | A1 | 6/2009 | Shoemaker |
| 2009/0144652 | A1* | 6/2009 | Wiley ............................ 715/800 |
| 2009/0147023 | A1 | 6/2009 | Jetha et al. |
| 2009/0172587 | A1* | 7/2009 | Carlisle et al. ................ 715/781 |
| 2009/0254855 | A1* | 10/2009 | Kretz et al. ................... 715/800 |
| 2009/0265656 | A1 | 10/2009 | Jetha |
| 2009/0284542 | A1 | 11/2009 | Baar |
| 2010/0026718 | A1 | 2/2010 | Jetha |
| 2010/0033503 | A1 | 2/2010 | Baar |
| 2010/0045702 | A1 | 2/2010 | Doyle |
| 2010/0201785 | A1 | 8/2010 | Lantin |
| 2010/0208968 | A1 | 8/2010 | Shoemaker et al. |
| 2010/0262907 | A1 | 10/2010 | Shoemaker et al. |
| 2011/0161873 | A1* | 6/2011 | Murakami et al. ............ 715/800 |
| 2011/0271227 | A1* | 11/2011 | Takahashi ..................... 715/800 |

FOREIGN PATENT DOCUMENTS

| | | |
|---|---|---|
| CA | 2393708 | 1/2004 |
| CA | 2394119 | 1/2004 |
| EP | 0635779 | 1/1995 |
| EP | 0650144 | 4/1995 |
| EP | 0816983 | 7/1998 |
| JP | 4410465 | 2/2010 |

OTHER PUBLICATIONS

"Final Office Action", U.S. Appl. No. 11/159,205, (Mar. 25, 2010), 16 pages.

"Notice of Allowance", U.S. Appl. No. 12/364,450, (Apr. 19, 2010), 4 pages.

"Non-Final Office Action", U.S. Appl. No. 11/236,694, (Apr. 20, 2010), 9 pages.

"Non Final Office Action", U.S. Appl. No. 12/368,263, (Apr. 30, 2010), 8 pages.

"Non Final Office Action", U.S. Appl. No. 12/368,267, (Jun. 11, 2010), 12 pages.

"Notice of Allowability", U.S. Appl. No. 12/364,450, (Jun. 18, 2010), 2 pages.

Carpendale, Marianne S. T., "A Framework for Elastic Presentation Space" (Burnaby, British Columbia: Simon Fraser University, 1999).

"Non Final Office Action", U.S. Appl. No. 11/541,778, (Jun. 19, 2009),36 pages.

"Non Final Office Action", U.S. Appl. No. 11/673,038, (Jul. 13, 2009),45 pages.

"Non Final Office Action", U.S. Appl. No. 11/410,024, (Jul. 20, 2009),27 pages.

Smith, et al., "Efficient techniques for wide-angle stereo vision using surface projection models", Retrieved from <http://ieee.org/stamp.jsp?arnumber=17045, (1999),6 pages.

"Non Final Office Action", U.S. Appl. No. 11/159,205, (Jul. 27, 2009),28 pages.

"Advisory Action", U.S. Appl. No. 11/249,493, (Aug. 11, 2009),5 pages.

"Advisory Action", U.S. Appl. No. 10/705,199, (Aug. 18, 2009),5 pages.

"Restriction Requirement", U.S. Appl. No. 11/935,222, (Aug. 20, 2009),6 pages.

"Advisory Action", U.S. Appl. No. 11/249,493, (Sep. 14, 2009),4 pages.

"Non-Final Office Action", U.S. Appl. No. 12/364,450, (Sep. 30, 2009),10 pages.

"Notice of Allowance", U.S. Appl. No. 10/358,394, (Oct. 8, 2009),8 pages.

"Non Final Office Action", U.S. Appl. No. 11/541,778, (Sep. 29, 2010), 10 pages.

"Non Final Office Action", U.S. Appl. No. 11/695,104, (Oct. 1, 2010), 9 pages.

"Final Office Action", U.S. Appl. No. 11/159,205, (Oct. 6, 2010),16 pages.

"Non Final Office Action", U.S. Appl. No. 11/236,694, (Oct. 13, 2010), 16 pages.

Lieberman, Henry "Power of Ten Thousand—Navigating in Large Information Spaces", *Proceedings of the 7th annual ACM symposium on User interface software and technology*, Marina del Rey, California, United States, (Nov. 1994), pp. 15-16.

Mills, Michael et al., "A Magnifier Tool for Video Data", *Proceedings of the SIGCHI conference on Human factors in computing systems*, (1992), pp. 93-96.

Kline, Richard L., et al., "Improving GUI Accessibility for People with Low Vision", *Proceedings of the SIGCHI conference on Human factors in computing systems*, (1995), pp. 114-121.

Perlin, Ken et al., "Pad—an alternative approach to the computer interface", *International Conference on Computer Graphics and Interactive Techniques. Proceedings of the 20th annual conference on Computer graphics and interactive techniques.*, (1993), pp. 57-64.

Bier, Eric A., et al., "The Movable Filter as a User Interface Tool—The Video", *Conference on Human Factors in Computing Systems Conference companion on Human factors in computing systems*, (1995), pp. 413-414.

Bier, Eric A., et al., "Toolglass and Magic Lenses—The See-Through Interface", *International Conference on Computer Graphics and Interactive Techniques Proceedings of the 20th annual conference on Computer graphics and interactive techniques*, (1993), pp. 73-80.

Bier, Eric A., et al., "Toolglass and Magic Lenses—The See-Through Interface", *Conference on Human Factors in Computing Systems Conference companion on Human factors in computing systems*, (1994), pp. 445-446.

Kamba, Tomonari et al., "Using Small Screen Space More Efficiently", *CHI 96* Vancouver, BC Canada, (1996), pp. 383-390.

"Final Office Action", U.S. Appl. No. 12/368,263, (Nov. 5, 2010), 7 pages.

"Final Office Action", U.S. Appl. No. 12/764,724, (Nov. 9, 2010), 21 pages.

"Final Office Action", U.S. Appl. No. 11/691,686, (Nov. 22, 2010), 16 pages.

"Final Office Action", U.S. Appl. No. 11/935,222, (Nov. 24, 2009), 8 pages.

"Final Office Action", U.S. Appl. No. 11/541,778, (Dec. 4, 2009), 12 pages.

"Notice of Allowance", U.S. Appl. No. 11/214,886, (Dec. 15, 2009), 16 pages.

"Non Final Office Action", U.S. Appl. No. 12/388,437, (Jun. 23, 2010), 7 pages.

"Non Final Office Action", U.S. Appl. No. 12/764,724, (Jul. 1, 2010), 20 pages.

"Non Final Office Action", U.S. Appl. No. 11/673,038, (Jul. 22, 2010), 39 pages.

"Final Office Action", U.S. Appl. No. 11/691,686, (Sep. 1, 2010), 16 pages.

"Non Final Office Action", U.S. Appl. No. 11/138,979, (Sep. 17, 2010), 11 pages.

Robertson, et al., "'The Document Lens'", (1993),pp. 101-108.

"Non Final OA", U.S. Appl. No. 11/935,222, (Feb. 20, 2009),12 pages.

Carpendale, M.S.T et al., "'A Framework for Unifying Presentation Space'", *01UIST. Proceedings of the 14th Annual ACM Symposium on User Interface Software and Technology, Proceedings of UIST'01: ACM Symposium on User Interface Software and Technology*, Orlando, FL, USA; XP002249323 2001, New York, NY, USA, ISBN: 1-58113-438-X,(Nov. 14, 2001),pp. 61-70; p. 64 XP002249323 2001, New York, NY, USA, ISBN: 1-58113-438-X,pp. 61-70; p. 64.

(56) References Cited

OTHER PUBLICATIONS

Ikedo, T ""A Realtime Video-Image Mapping User Polygon Rendering Techniques"", *IEEE Intl. conf on Ottawa*, ONT, Canada Jun. 3-6, 1997, Los Alamitos, CA, USA; *IEEE Comput. Soc, US*, XP010239181, ISBN: 0-8186-7819-4 Sections 2, 4.4; Multimedia Computing and Systems '97 Proceedings,(Jun. 3, 1997),pp. 127-134.

Bouju, A. et al., ""Client-Server Architecture for Accessing Multimedia and Geographic Databases within Embedded Systems"", *Database and Expert Systems Applications, 1999 Proceedings*. Tenth International Workshop on Florence, Italy Sep. 1-3, 1999, Los Alamitos, CA, USA, *IEEE Comput. Soc, US*, XP010352370; ISBN:0-7695-0281-4, abstract, figure 2,(Sep. 1-3, 1999),pp. 760-764.

Robertson, G et al., "The Document Lens", *UIST. Proceedings of the Annual ACM Symposium on User Interface Software and Technology*. abstract figures 3,4,(Nov. 3, 1993),pp. 101-108.

Dursteler, Juan C., "The digital magazine of InfoVis.net", Retrieved from: http://www.infovis.net/printMag.php?num=85&lang=2; (Apr. 22, 2002).

"Presentation for CGDI Workshop", Retrieved from: http://www.geoconnections.org/developersCorner/devCorner_devNetwork/meetings/2002.05.30/IDELIX_CGDI_20020530_dist.pdf, (May 2002).

Kuederle, Oliver ""Presentation of Image Sequences: A Detail-in-Context Approach"", Thesis, Simon Fraser University; (Aug. 2000),pp. 1-3, 5-10, 29-31.

Microsoft Corp., "Microsoft Paint", Microsoft Corp.,(1981-1998),Paint 1-14.

"Electronic Magnifying Glasses", *IBM Technical Disclosure Bulletin, IBM Corp.*, New York, US, vol. 37, No. 3; XP000441501, ISSN: 0018-8689 the whole document; (Mar. 1, 1994),pp. 353-354.

Keahey, T. A., ""The Generalized Detail-In-Context Problem"", *Information Visualization 1998, Proceedings; IEEE Symposium On Research* Triangle, CA, USA; Los Alamitos, CA, USA, IEEE Comput. Soc, US; XP010313304; ISBN: 0-8186-9093,(Oct. 19-20, 1998),pp. 44-51, 152.

Carpendale, et al., ""3-Dimensional Pliable Surfaces: For the Effective Presentation of Visual Information"", *Proceedings of the 8th annual ACM symposium on User interface and software technology*; (Dec. 1995).

Carpendale, M S T et al., ""Extending distortion viewing from 2D to 3D"", *IEEE Computer Graphics and Applications, IEEE Inc*. New York, US, vol. 17, No. 4; XP000927815, ISSN: 0272-1716. (Jul. 1997),pp. 42-51.

Viega, J et al., ""3D magic lenses"", *Proceedings of the 9th annual ACM symposium on User interface software and technology*; Pub 1996 ACM Press New York, NY, USA; (1996),51-58.

Cowperthwaite, David J., ""Occlusion Resolution Operators for Three-Dimensional Detail-In-Context"", Burnaby, British Columbia: Simon Fraser University; (2000).

Carpendale, M.S.T. ""A Framework For Elastic Presentation Space"", Thesis Simon Fraser University, XP001051168; Chapter 3-5; appendix A,B; (Mar. 1999),pp. 1-271.

Carpendale, M.S.T. et al., ""Exploring Distinct Aspects of the Distortion Viewing Paradigm"", Technical Report TR 97-08, School of Computer Science, Simon Fraser University, Burnaby, British Columbia, Canada; (Sep. 1997).

Cowperthwaite, David J., et al., ""Visual Access for 3D Data"", *in Proceedings of ACM CHI 96 Conference on Human Factors in Computer Systems, vol. 2 of Short Papers: Alternative Methods of Interaction*; (1996),pp. 175-176.

Keahey, T. A., ""Visualization of High-Dimensional Clusters Using NonLinear Magnification"", Technical Report LA-UR-98-2776, *Los Alamos National Laboratory*; (1998).

Tigges, M. et al., ""Generalized Distance Metrics For Implicit Surface Modeling"", *Proceedings of the Tenth Western Computer Graphics Symposium*; (Mar. 1999).

Bossen, F. J., ""Anisotropic Mesh Generation With Particles"", Technical Report CMU-CS-96-134, CS Dept, Carnegie Mellon University; (May 1996).

Bossen, F. J., et al., ""A Pliant Method For Anisotropic Mesh Generation"", *5th Intl. Meshing Roundtable*; (Oct. 1996),pp. 63-74.

Wilson, et al., ""Direct Volume Rendering Via 3D Textures"", Technical Report UCSC-CRL-94-19, University of California, Santa Cruz, Jack Baskin School of Engineering; (Jun. 1994).

Carpendale, M.S.T. "A Framework for Elastic Presentation Space", PhD thesis, Simon Fraser University; (1999),pp. 69, 72, 78-83,98-100, 240, and 241.

Keahey, T. A., et al., ""Techniques For Non-Linear Magnification Transformations"", *Information Visualization '96, Proceedings IEEE Symposium On, San Francisco, CA, Los Alamitos, CA, USA, IEEE Comput. Soc, US*: XP010201943; ISBN: 0-8186-7668-X the whole document,(Oct. 28, 1996),pp. 38-45.

Carpendale, M. Sheelagh T., et al., ""3-Dimensional Pliable Surfaces: For the Effective Presentation of Visual Information"", *UIST '95, 8th Annual Symposium On User Interface Software and Technology, Proceedings of the ACM Symposium On User Interface Software and Technology, Pittsburgh, PA, ACM Symposium On User Interface Software and Technology*, New York, (1995-, (Nov. 14-17, 1995),pp. 217-226.

Tominski, Christian et al., ""Fisheye Tree Views and Lenses for Graph Visualization"", pp. 1-8.

Keahey, T. A., ""Getting Along: Composition of Visualization Paradigms"", *Visual Insights, Inc.*; (2001).

Sakamoto, Chikara et al., ""Design and Implementation of a Parallel Pthread Library (PPL) with Parallelism and Portability"", *Systems and Computers in Japan, New York, US*, vol. 29, No. 2; XP000752780, ISSN: 0882-1666 abstract,(Feb. 1, 1998),pp. 28-35.

Deng, K. et al., ""Texture Mapping with a Jacobian-Based Spatially-Variant Filter","", *Proceedings 10th Pacific Conference on Computer Graphics and Applications*, Beijing, China, 2002 Los Alamitos, CA, USA, *IEEE Comput. Soc, USA*; XP00224932, ISBN; 0-7695-1784-6 the whole document,(Oct. 9-11, 2002),pp. 460-461.

Welsh, Michelle "Futurewave Software", *Business Wire*; (Nov. 15, 1993).

Lamar, et al., "A Magnification Lens for Interactive Volume Visualization", *ACM*; pp. 1-10.

Fitzmaurice, G. et al., ""Tracking Menus"", *UIST*; (2003),pp. 71-79.

Stone, et al., "The movable filter as a user interface tool", *Proceedings of CHI ACM*; (1992),pp. 306-312.

Baudisch, P. et al., ""Halo: a Technique for Visualizing Off-Screen Locations"", *CHI*; (Apr. 5-10, 2003).

Baudisch, P. et al., ""Drag-And-Pop: Techniques For Accessing Remote Screen Content On Touch-And-Pen-Operated Systems"", *Interact '03*, (2003).

Carpendale, M.S.T. et al., ""Making Distortions Comprehensible"", *Visual Languages, Proceedings, 1997 IEEE Symposium On Isle of Capri*, Italy, Sep. 23-26, 1997, Los Alamitos, CA, USA, *IEEE Comput. Soc.*, US, XP010250566, ISBN: 0-8186-8144-6,pp. 36-45.

Ito, Minoru et al., ""A Three-Level Checkerboard Pattern (TCP) Projection Method for Curved Surface Measurement"", *Pattern Recognition, Pergamon Press Inc.*, Elmsford, N.Y., US vol. 28, No. 1; XP004014030, ISSN 0031-3203,(1995),pp. 27-40.

Keahey, T A., et al., ""Nonlinear Magnification Fields"", *Information Visualization, 1997, Proceedings, IEEE Symposium On Phoenix, AZ, USA*, Los Alamitos, CA, USA, *IEEE Comput. Soc.*, XP010257169; ISBN: 0-8186-8189-6,(Oct. 20-21, 1997),pp. 51-58 and 121.

Rauschenbach, U. ""The Rectangular Fish Eye View as an Efficient Method for the Transmission and Display of Large Images"", *Image Processing, ICIP 99, Proceedings, 1999 International Conference On*, Kobe, Japan, Oct. 24-28, 1999, Piscataway, NJ, USA, IEEE, US, XP010368852, ISBN 0-7803-5467-2 p. 115, left-hand column-p. 116, paragraph 3, p. 118, paragraph 7.1; (1999),pp. 115-119.

Keahey, T. A., "Nonlinear Magnification", (Indiana University Computer Science), (1997).

Watt, et al., "Advanced Animation and Rendering Techniques", (Addison-Wesley Publishing), (1992),p. 106-108.

Boots, B. N., "Delauney Triangles: An Alternative Approach to Point Pattern Analysis", *Proc. Assoc. Am. Geogr.* 6, (1974),p. 26-29.

Sheelagh, M. et al., ""Distortion Viewing Techniques for 3-Dimensional Data"", *Information Visualization '96, Proceedings IEEE Symposium On San Francisco, CA, USA, Los Alamitos, CA, USA,*

(56) References Cited

OTHER PUBLICATIONS

*IEEE Comput. Soc, US* Oct. 28, 1996; XP010201944; ISBN: 0-8186-7668-X,(Oct. 28-29, 1996),pp. 46-53, 119.

Leung, Y. K., et al., ""A Review and Taxonomy of Distortion-Oriented Presentation Techniques"", *ACM Transactions on Computer-Human Interaction, 'Online!* vol. 1, No. 2, XP002252314; Retrieved from the Internet: <URL:http://citeseer.nj.nec.com/ leung94review. html> 'retrieved on Aug. 21, 2003! the whole document,(Jun. 1994),pp. 126-160.

"Non Final Office Action", U.S. Appl. No. 10/358,394, (Mar. 13, 2009).

Sarkar, et al., "Stretching the Rubber Sheet: A Metaphor for Viewing Large Layouts on Small Screens", *Proc. of the 6th annual ACM symp. on User interface software an technology*, Atlanta, GA, (Dec. 1993),p. 81-91.

Carpendale, et al., "Graph Folding: Extending Detail and Context Viewing into a Tool for Subgraph Comparisons", *In Proceedings of Graph Drawing 1995*, Passau Germany, (1995),pp. 127-139.

Carpendale, M.S.T. "A Framework for Elastic Presentation Space", http://pages.cpsc.ucalgary.ca/~sheelagh/personal/thesis/, (Nov. 19, 1999).

"Non Final Office Action", U.S. Appl. No. 11/542,120, (Jan. 22, 2009),20 pages.

"BPAI Decision", U.S. Appl. No. 10/682,298, (Dec. 30, 2009),14 pages.

"Notice of Allowance", U.S. Appl. No. 11/410,024, (Jan. 4, 2010),7 pages.

"Final Office Action", U.S. Appl. No. 11/673,038, (Jan. 8, 2010), 33 pages.

"Advisory Action", U.S. Appl. No. 11/541,778, (Feb. 1, 2010), 3 pages.

"Advisory Action", U.S. Appl. No. 11/935,222, (Feb. 4, 2010), 3 pages.

"Restriction Requirement", U.S. Appl. No. 12/368,263, (Mar. 9, 2010), 7 pages.

"Notice of Allowance", U.S. Appl. No. 10/705,199, (Mar. 10, 2010),18 pages.

"Non Final Office Action", U.S. Appl. No. 11/691,686, (Mar. 18, 2010),17 pages.

"Non-Final Office Action", U.S. Appl. No. 11/410,024, (Mar. 11, 2009),35 pages.

"Foreign Office Action", Application Serial No. 2002-536993, (Mar. 11, 2009),2 pages.

"Notice of Allowance", U.S. Appl. No. 11/401,349, (Apr. 17, 2009),35 pages.

Schmalstieg, Dieter et al., "Using transparent props for interaction with the virtual table", U.S. Appl. No. 11/410,024, Proceedings of the 1999 symposium on Interactive 3D graphics.,(Apr. 26, 1999),8 pages.

"Non Final Office Action", U.S. Appl. No. 10/705,199, (May 12, 2009),46 pages.

* cited by examiner

DYNAMIC DETAIL-IN-CONTEXT USER INTERFACE FOR APPLICATION ACCESS AND CONTENT ACCESS ON ELECTRONIC DISPLAYS

This application claims priority from U.S. Provisional Patent Application No. 60/952,110, filed Jul. 26, 2007, and incorporated herein by reference.

FIELD OF THE INVENTION

This invention relates to the field of computer graphics processing, and more specifically, to a method and system for generating and adjusting detailed views of selected information within the context of surrounding information presented on the display of a data processing system including a wireless device.

BACKGROUND OF THE INVENTION

Modern data processing systems including wireless devices (e.g., personal digital assistants ("PDAs"), cellular telephones, mobile devices, global positioning system ("GPS") receivers, etc.) are used for numerous applications such as electronic mail, voice and data communications, word processing, mapping, navigation, computer games, etc. In general, these applications are launched by the system's operating system upon selection by a user from a menu or other graphical user interface ("GUI"). A GUI is used to convey information to and receive commands from users and generally includes a variety of GUI objects or controls, including icons, toolbars, drop-down menus, text, dialog boxes, buttons, and the like. A user typically interacts with a GUI by using a pointing device (e.g., a mouse) to position a pointer or cursor over an object and "clicking" on the object.

One problem with these data processing systems and devices is their inability to effectively display detailed information for selected graphic objects when those objects are in the context of a larger image. A user may require access to detailed information with respect to an object in order to closely examine the object, to interact with the object, or to interface with an external application or network through the object. For example, the detailed information may be a close-up view of the object or a region of a digital map image.

While an application may provide a GUI for a user to access and view detailed information for a selected object in a larger image, in doing so, the relative location of the object in the larger image may be lost to the user. Thus, while the user may have gained access to the detailed information required to interact with the object, the user may lose sight of the context within which that object is positioned in the larger image. This is especially so when the user must interact with the GUI using a computer mouse, keyboard, or keypad. The interaction may further distract the user from the context in which the detailed information is to be understood. This problem is an example of what is often referred to as the "screen real estate problem".

The screen real estate problem generally arises whenever large amounts of information are to be displayed on a display screen of limited size. Known tools to address this problem include panning and zooming. While these tools are suitable for a large number of visual display applications, they become less effective where sections of the visual information are spatially related, such as in layered maps and three-dimensional representations, for example. In this type of information display, panning and zooming are not as effective as much of the context of the panned or zoomed display may be hidden.

The screen real estate problem is most apparent in wireless devices having small display screens. In particular, wireless devices such as cellular phones, PDAs, and portable GPS navigation devices typically present usability challenges in making device functions efficiently and easily accessible, due to limited-sized displays and other device limitations such as small keyboards or small active input surfaces (e.g., touchscreens) for user input. Such problems are compounded by the increasing functionality of modern wireless devices, wherein new capabilities such as cameras, music players, and video players are being incorporated into these devices, making these devices increasingly complex. The end result is that the user typically faces difficulties in efficiently gaining a desired access to a particular device feature, or to particular content, while maintaining awareness of how to access other device capabilities or content.

Advances in detail-in-context presentation technologies (such as described in U.S. Pat. No. 7,106,349, which is incorporated herein by reference) show promise in dealing with display screen real estate challenges. Furthermore, the coupling of such technologies with animated transitions to new presentation states (such as described in U.S. patent application Ser. No. 10/989,070, which is incorporated herein by reference) and to touchscreen displays (such as described in U.S. patent application Ser. No. 11/249,493, which is incorporated herein by reference) or other means of user input may be of assistance in dealing with small device user interface problems. However, a need remains for an improved user interface for such devices.

A need therefore exists for an improved method and system for generating and adjusting detailed views of selected information within the context of surrounding information presented on the display of a data processing system. Accordingly, a solution that addresses, at least in part, the above and other shortcomings is desired.

SUMMARY OF THE INVENTION

According to one aspect of the invention, there is provided a method for presenting applications on a display screen, comprising: displaying a first presentation on the display screen, the first presentation including two or more icons; receiving a signal indicative of an icon, the icon being one of the two or more icons, the icon having an application associated therewith; initiating the application, the application having information associated therewith; generating a second presentation, the second presentation having a first area for presenting the information at least partially surrounded by a second area for presenting reduced-size versions of the two or more icons other than the icon; and, displaying the second presentation on the display screen to replace display of the first presentation.

According to another aspect of the invention, there is provided a method for presenting information on a display screen, comprising: displaying a first presentation on the display screen, the first presentation including a first icon and a second icon; receiving a signal indicative of the first icon, the first icon having information associated therewith; generating a second presentation, the second presentation having an inner display area for presenting the information at least partially surrounded by an outer display area for presenting a reduced-size version of the second icon; and, displaying the second presentation on the display screen to replace display of the first presentation.

In accordance with further aspects of the present invention there is provided an apparatus such as a data processing system or wireless device, a method for adapting this system or device, as well as articles of manufacture such as a computer readable medium having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

In the following description, details are set forth to provide an understanding of the invention. In some instances, certain software, circuits, structures and methods have not been described or shown in detail in order not to obscure the invention. The term "data processing system" is used herein to refer to any machine for processing data, including the wireless devices, computer systems, and network arrangements described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention. The present invention may also be implemented in hardware.

Figure 1:
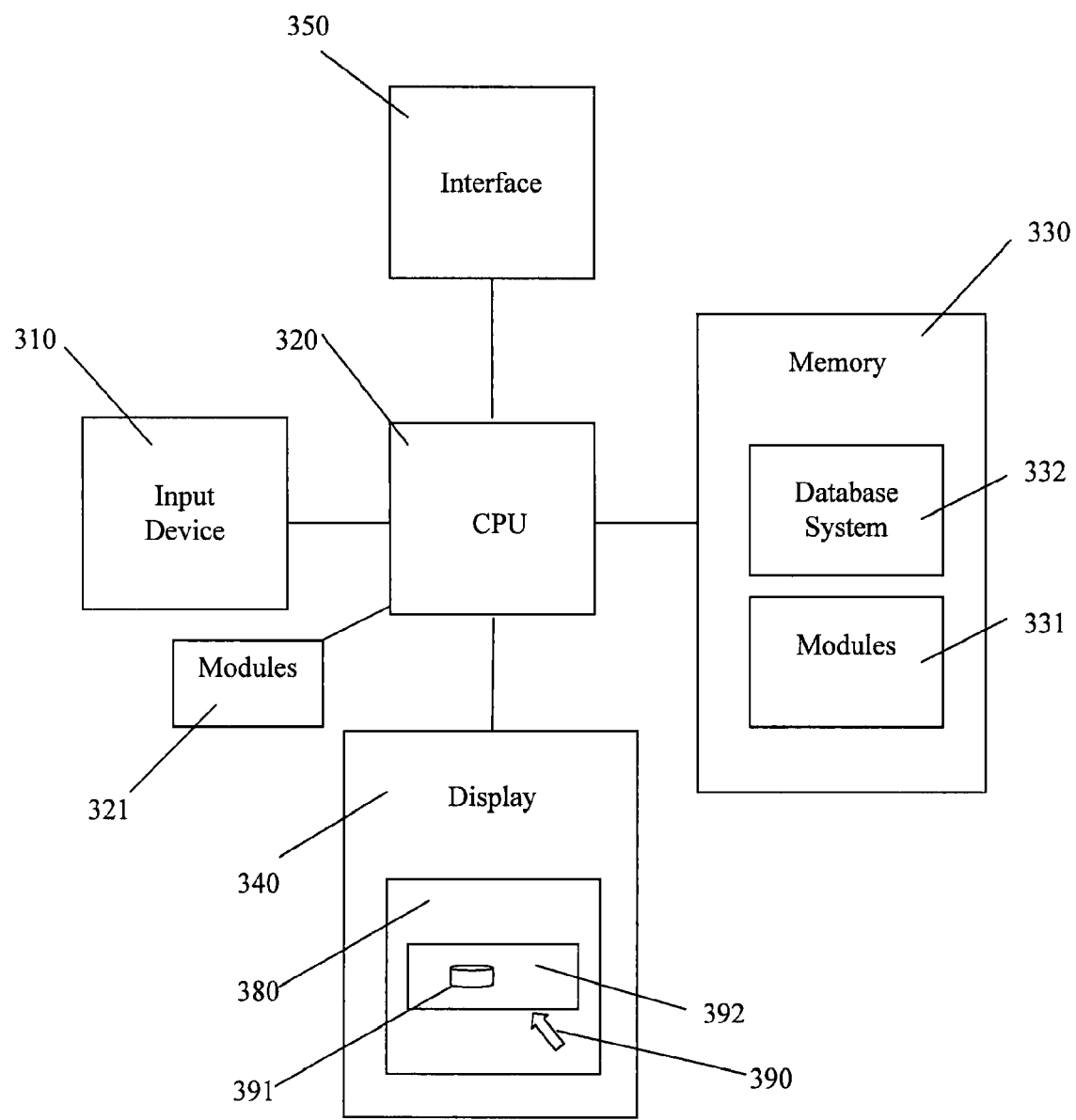
FIG. 1 is a block diagram illustrating a data processing system adapted for implementing an embodiment of the invention.

FIG. 1 is a block diagram illustrating a data processing system 300 adapted to implement an embodiment of the invention. The data processing system 300 is suitable for generating, displaying, and adjusting presentations in conjunction with a graphical user interface ("GUI"), as described below. The data processing system 300 may be a wireless device or other portable or handheld device. The data processing system 300 may also be a client and/or server in a client/server system. For example, the data processing system 300 may be a server system or a personal computer ("PC") system. The data processing system 300 includes an input device 310, a central processing unit ("CPU") 320, memory 330, a display 340, and an interface device 350. The input device 310 may include a keyboard, a keypad, a mouse, a trackball, a thumbwheel, a touch sensitive surface or screen, a position tracking device, an eye tracking device, or a similar device. The display 340 may include a computer screen, television screen, display screen, terminal device, a touch sensitive display surface or screen, or a hardcopy producing output device such as a printer or plotter. The memory 330 may include a variety of storage devices including internal memory and external mass storage typically arranged in a hierarchy of storage as understood by those skilled in the art. For example, the memory 330 may include databases, random access memory ("RAM"), read-only memory ("ROM"), flash memory, and/or disk devices. The interface device 350 may include one or more network connections. The data processing system 300 may be adapted for communicating with other data processing systems (not shown) over a network (not shown) via the interface device 350. For example, the interface device 350 may include an interface to a network such as the Internet and/or another wired or wireless network. The interface device 350 may include transmitters, receivers, and antennae for interfacing with wireless networks. Thus, the data processing system 300 may be linked to other data processing systems by the network. The CPU 320 may include or be operatively coupled to dedicated coprocessors, memory devices, or other hardware modules 321. The CPU 320 is operatively coupled to the memory 330 which stores an operating system (not shown) for general management of the system 300. The CPU 320 is operatively coupled to the input device 310 for receiving user commands or queries and for displaying the results of these commands or queries to the user on the display 340. Commands and queries may also be received via the interface device 350 and results may be transmitted via the interface device 350. The data processing system 300 may include a database system 332 for storing data and programming information. The database system 332 may include a database management system and a database and may be stored in the memory 330 of the data processing system 300. In general, the data processing system 300 has stored therein data representing sequences of instructions which when executed cause the method described herein to be performed. Of course, the data processing system 300 may contain additional software and hardware a description of which is not necessary for understanding the invention.

Thus, the data processing system 300 includes computer executable programmed instructions for directing the system 300 to implement the embodiments of the present invention. The programmed instructions may be embodied in one or more hardware modules 321 or software modules 331 resident in the memory 330 of the data processing system 300 or elsewhere (e.g., 320). Alternatively, the programmed instructions may be embodied on a computer readable medium (e.g., a compact disk ("CD"), a floppy disk, etc.) which may be used for transporting the programmed instructions to the memory 330 of the data processing system 300. Alternatively, the programmed instructions may be embedded in a computer-readable signal or signal-bearing medium that is uploaded to a network by a vendor or supplier of the programmed instructions, and this signal or signal-bearing medium may be downloaded through an interface (e.g., 350) to the data processing system 300 from the network by end users or potential buyers.

A user may interact with the data processing system 300 and its hardware and software modules 321, 331 using a graphical user interface ("GUI") 380. The GUI 380 may be used for monitoring, managing, and accessing the data processing system 300. GUIs are supported by common operating systems and provide a display format which enables a user to choose commands, execute application programs, manage computer files, and perform other functions by selecting pictorial representations known as icons, or items from a menu through use of an input device 310 such as a mouse, thumbwheel, trackball, or keypad. In general, a GUI is used to convey information to and receive commands from users and generally includes a variety of GUI objects or controls, including icons, toolbars, drop-down menus, text, dialog boxes, buttons, and the like. A user typically interacts with a GUI 380 presented on a display 340 by using an input device (e.g., a mouse, thumbwheel, trackball, or keypad) 310 to position a pointer or cursor 390 over an object (e.g., an icon) 391 and by "clicking" on the object 391. Typically, a GUI based system presents application, system status, and other information to the user in one or more "windows" appearing on the display 340. A window 392 is a more or less rectangular area within the display 340 in which a user may view an application or a document. Such a window 392 may be open, closed, displayed full screen, reduced to an icon, increased or reduced in size, or moved to different areas of the display 340. Multiple windows may be displayed simultaneously, such as: windows included within other windows, windows overlapping other windows, or windows tiled within the display area.

As mentioned above, the screen real estate problem is most apparent in wireless devices 300 having small display screens 340. In particular, wireless devices 300 such as cellular phones, PDAs, and portable GPS navigation devices typically present usability challenges in making device functions efficiently and easily accessible, due to limited-sized displays 340 and other device limitations such as small keyboards 310 or small active input surfaces (e.g., touchscreens) 310 for user input. Such problems are compounded by the increasing functionality of modern wireless devices 300, wherein new capabilities such as cameras, music players, and video players are being incorporated into these devices, making these devices increasingly complex. The end result is that the user typically faces difficulties in efficiently gaining a desired access to a particular device feature, or to particular content, while maintaining awareness of how to access other device capabilities or content.

Advances in detail-in-context presentation methods (such as described in U.S. Pat. No. 7,106,349, which is incorporated herein by reference) show promise in dealing with display real estate challenges. Furthermore, the coupling of such technologies with animated transitions to new presentation states (such as described in U.S. patent application Ser. No. 10/989,070, which is incorporated herein by reference) and to touchscreen displays (such as described in U.S. patent application Ser. No. 11/249,493, which is incorporated herein by reference) or other means of user input may be of assistance in dealing with small device user interface problems. However, a need remains for an improved user interface for such devices.

According to one embodiment, the present invention provides detail-in-context presentation methods for devices 300 with small displays 340, and various forms 310 of user input, to provide an improved user interface 380 for such devices 300.

For reference, the term "detail-in-context" refers to the magnification of a particular region-of-interest (the "detail") in an original image while preserving visibility of the surrounding information (the "context"). A presentation including a detail-in-context lens (or inset magnifier) may be referred to as a detail-in-context presentation. In general, a detail-in-context presentation may be considered as a distorted view of a portion of an original image (i.e., about the region-of-interest) where the distortion is the result of the application of a "lens" like distortion function to the original image (or the application of an inset magnifier to the original image). Detail-in-context presentations may be generated using a variety of the methods. A detailed review of various detail-in-context presentation methods may be found in a publication by Marianne S. T. Carpendale, entitled "A Framework for Elastic Presentation Space" (Carpendale, Marianne S. T., *A Framework for Elastic Presentation Space* (Burnaby, British Columbia: Simon Fraser University, 1999)), and incorporated herein by reference. Reference may also be made to U.S. Pat. Nos. 7,197,719 and 7,213,214, which are incorporated herein by reference.

According to one embodiment, a detail-in-context presentation may be generated by applying a lens to a region-of-interest in an original image as follows. First, the undistorted original image is located in a base plane of a three-dimensional perspective viewing volume or frustum. A viewpoint is typically located above a centre point of a view plane which is located above the base plane. Points of the original image in the base plane are displaced upward onto a distorted surface or lens which is defined by a three-dimensional distortion function (e.g., the lens may have a truncated pyramid shape having a flat rectangular top surrounded by four inclined trapezoidal sides). The displaced points are then perspectively projected onto the view plane to generate the presentation. The direction of the projection may be in the direction of a line constructed through a point in the base plane through a point in the focal region of the lens. The projection may be in a direction that is viewer-aligned (i.e., the point in the base plane, the point in the focal region, and the viewpoint are collinear). The resultant combination of magnification and compression of the original image as seen in the view plane from the viewpoint results in a lens-like effect similar to that of a magnifying glass being applied to the original image. In general, the lens has a "focal region" (e.g., the flat rectangular top of a lens having a truncated pyramid shape) for the region-of-interest. The focal region has an elevation (or magnification) that produces a corresponding "magnified region" for the region-of-interest upon projection onto the view plane. At least partially surrounding the focal region is a "shoulder region" (e.g., the four inclined trapezoidal sides of a lens having a truncated pyramid shape) where the elevation (or magnification) decreases from that of the focal region to that of the original image surrounding the shoulder region and which produces a corresponding at least partially "compressed region" upon projection onto the view plane.

According to another embodiment, a detail-in-context presentation may be generated by applying an inset magnifier to an original image. An inset magnifier may be thought of as a lens without a shoulder region or as a lens with a vertical shoulder region. Projection may not be required for generating a presentation having an inset magnifier.

Now, modern wireless devices include devices such as the Motorola™ RAZR™ V3c™ cellular telephone, the Nokia™ N95™ multimedia computer, and the Apple™ iPhone™. Beyond basic cellular telephone capabilities, each of these devices typically has numerous software applications and multimedia content resident on the device, or alternately, accessible via a network.

Figure 2:
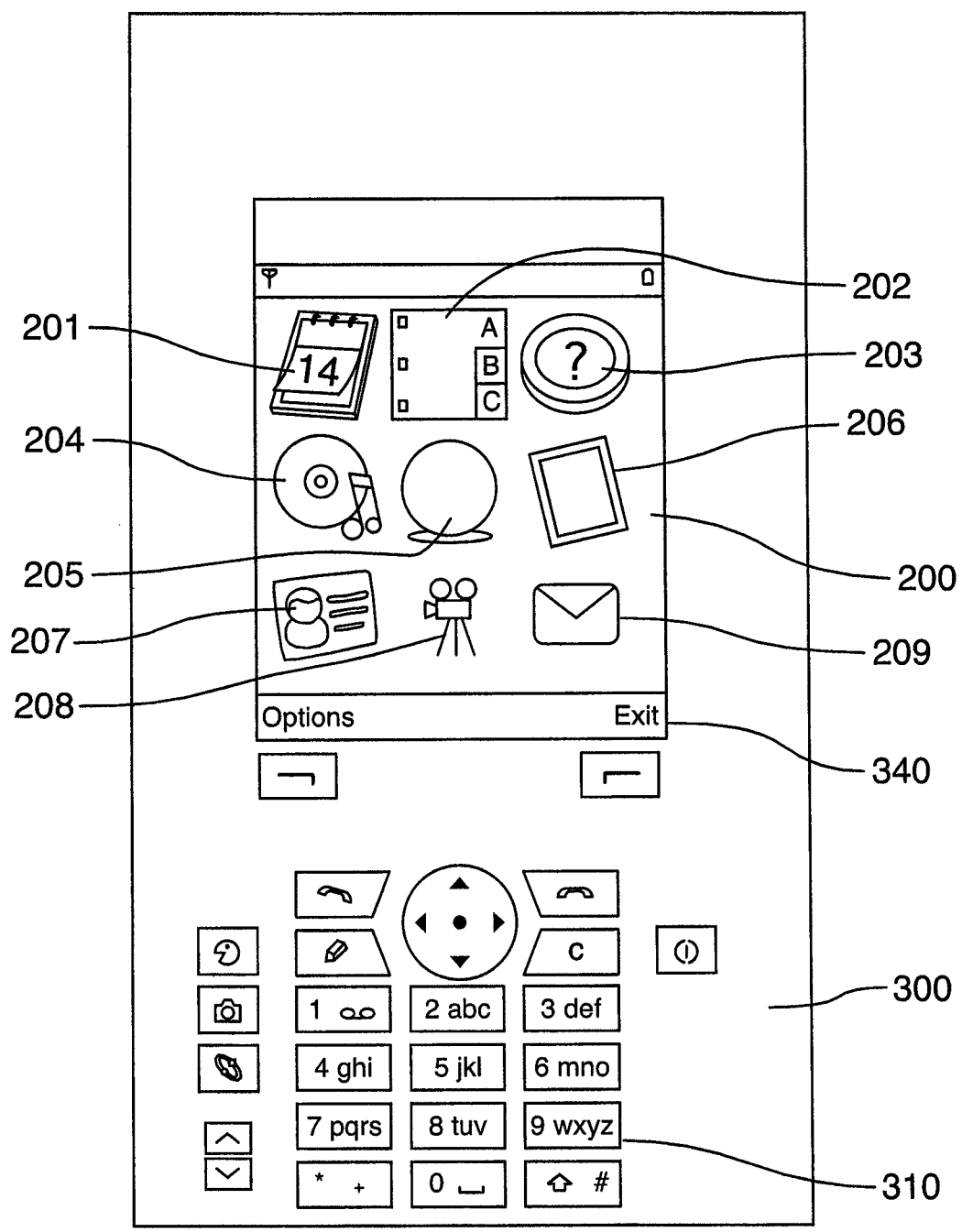
FIG. 2 is a front view illustrating a wireless device (or data processing system) having a first graphical user interface in accordance with an embodiment of the invention.

FIG. 2 is a front view illustrating a wireless device 300 (or data processing system 300) having a first graphical user interface 200 in accordance with an embodiment of the invention. The wireless device 300 includes a display screen 340, an input device (i.e., a keypad, trackball, and various function keys) 310, etc., as described above with respect to FIG. 1. FIG. 2 shows a representative "home screen" presentation 200 (i.e., the first graphical user interface 200) displayed on the display screen 340. The home screen presentation 200 has a selection of icons 201-209 representing device capabilities, information, or content that can be accessed or otherwise activated based on an input signal caused by the user (i.e., via the input device 310). The home screen presentation 200 may be displayed as the default presentation of the device 300 prior to any user input, or may be arrived at after a simple input by the user such as a screen tap, in the case of touch-screen input, or the pressing of a specific key 310, in the case of keyboard input. Further user input may select a particular icon (e.g., 205) and then activate or initiate the application associated with the icon. Upon activation of the application, all or most of the available screen real estate will typically be allocated to the application itself, such that the original icons 201-209 may no longer be visible. Note that the application could be, for example, a media player or a file manager application for browsing local and remote content.

Figure 3:
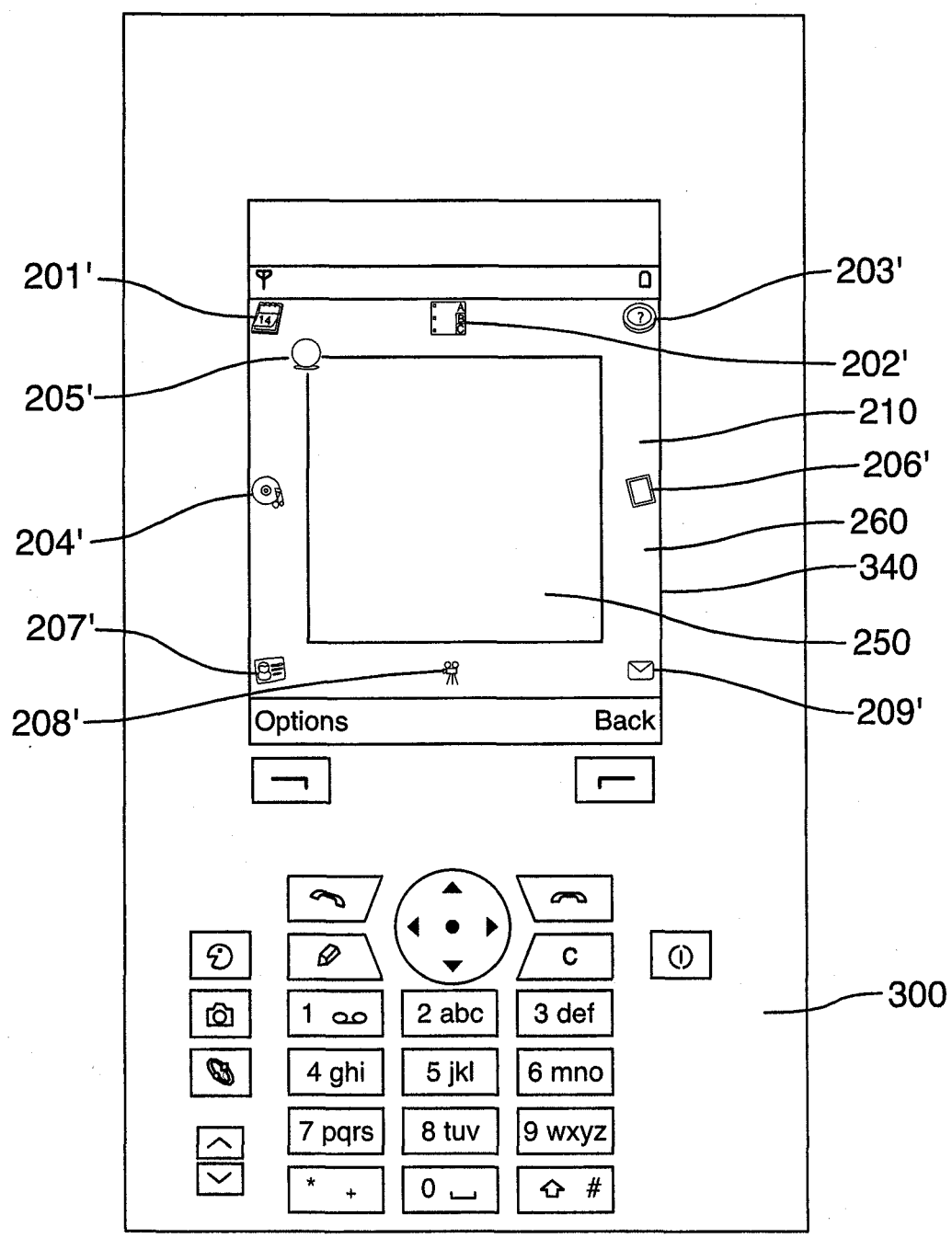
FIG. 3 is front view illustrating the wireless device of FIG. 2 having a second graphical user interface in accordance with an embodiment of the invention.
Figure 4:
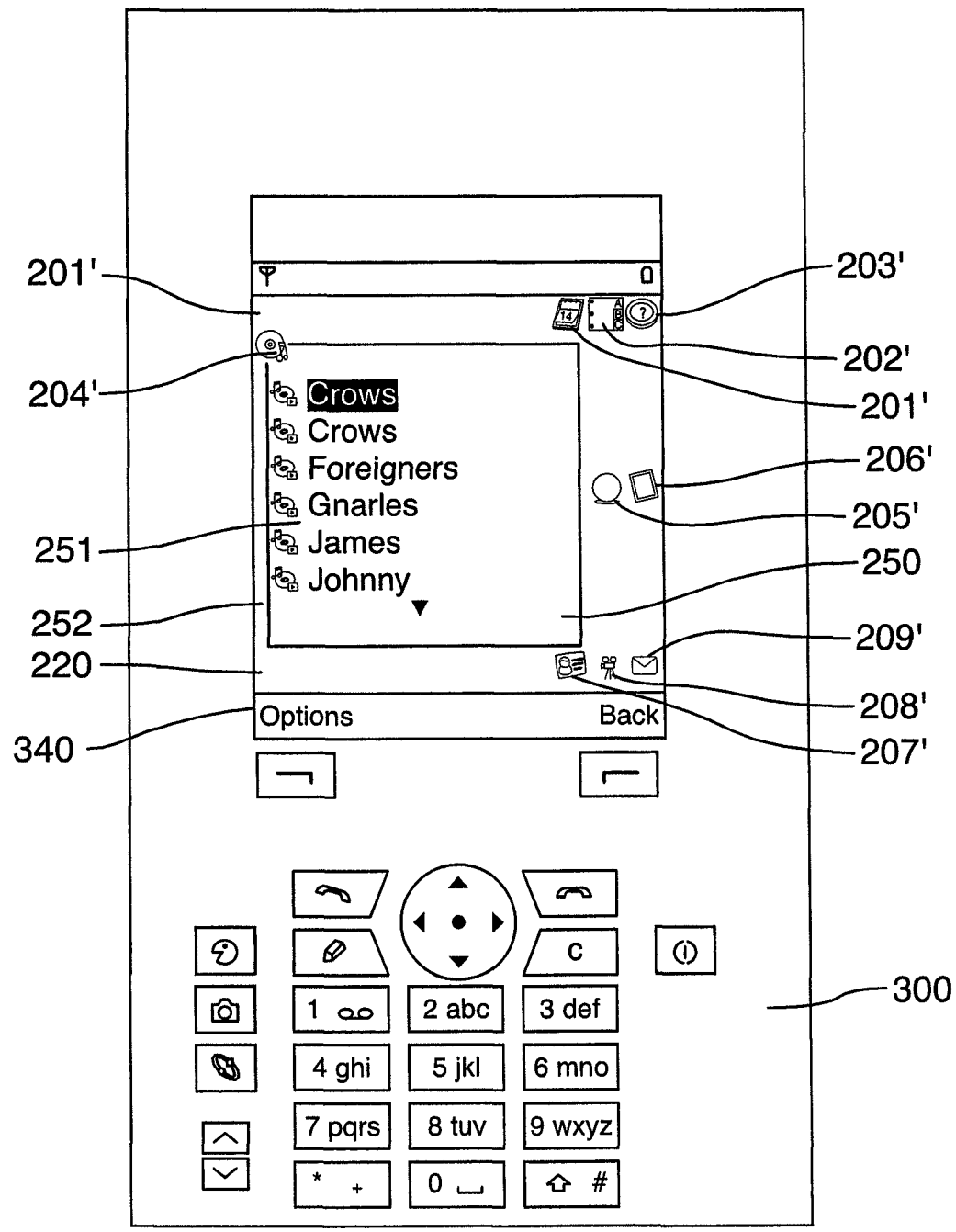
FIG. 4 is front view illustrating the wireless device of FIG. 2 having a third graphical user interface in accordance with an embodiment of the invention.

FIG. 3 is front view illustrating the wireless device 300 of FIG. 2 having a second graphical user interface 210 in accordance with an embodiment of the invention. The second graphical user interface 210 is a representative "next" presentation 210 which is displayed on the display screen 340 after selection and activation events for the center icon 205 shown in the home screen presentation 200 of FIG. 2. The next presentation 210 may be arrived at from the same type of user input. In this next presentation 210, the icons 201'-209' from the home screen presentation 200 have been both resized to a smaller size and displaced laterally to make room for a new inner display area 250. The new inner display area 250 is thus made available for use. The new inner display area 250 may be used as presentation space for the selected application, for information or content 251 associated with the application and/or icon 205, for the presentation of a list or menu of content 251 at a higher level of detail for further examination by the user as shown in FIG. 4, etc.

Note also in FIG. 3 that the relative angular position of the original icons 201-209 from FIG. 2 has been essentially preserved. One purpose of preserving the angular positions of the original icon 201-209 presentation 200 is to take advantage of the user's recollection of the angular positions, and to allow for the use of a typical keypad, keyboard, or hardware or software button layout such as that of a typical cellular telephone, to rapidly select individual icons 201-209. In the case of FIG. 3, a 3×3 icon arrangement is shown to this end, but other layouts are possible, for example, to efficiently match other keyboard layouts or to allow more icons to be shown.

Note also in FIG. 3 that the inner display area 250 is adjacent to the selected icon 205' (although that icon 205' has been reduced in size compared to the original icon 205) so as to assist the user in comprehending the device's reaction to the user's input.

Thus, the next presentation 210 has a new inner display area 250 (or first area 250) for displaying application information or content 251 associated with an icon 205 in the home screen presentation 200 and a new outer display area 260 (or second area 260) at least partially surrounding the first area 250 for displaying reduced-size versions 201'-204', 206'-209' of the remaining (or unselected) icons 201-204, 206-209.

Figure 5:
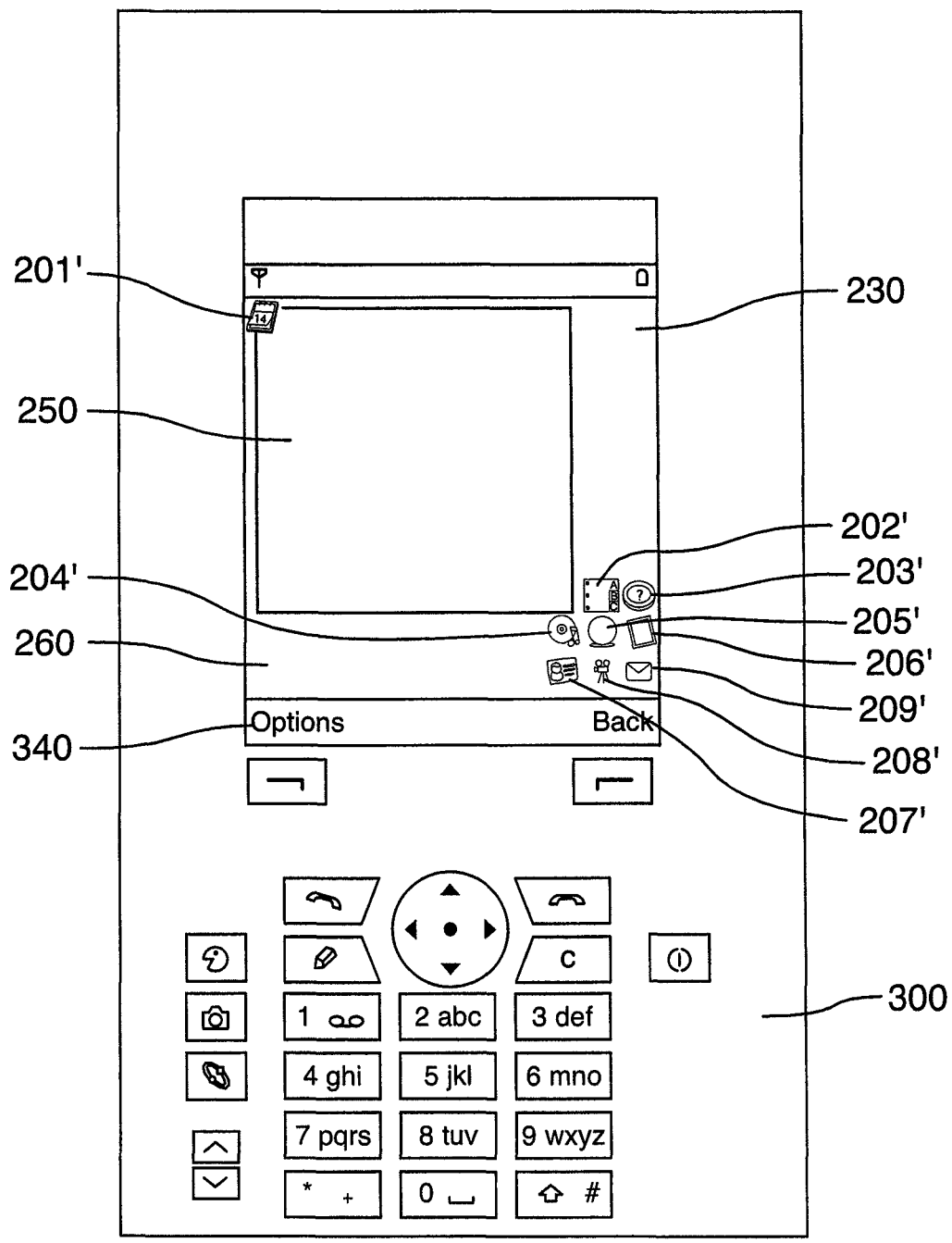
FIG. 5 is front view illustrating the wireless device of FIG. 2 having a fourth graphical user interface in accordance with an embodiment of the invention.

FIG. 4 is front view illustrating the wireless device 300 of FIG. 2 having a third graphical user interface 220 in accordance with an embodiment of the invention. And, FIG. 5 is front view illustrating the wireless device 300 of FIG. 2 having a fourth graphical user interface 230 in accordance with an embodiment of the invention. FIG. 4 shows a representative next presentation 220 that is displayed on the display screen 340 after selection and activation events for the left icon in the second row (i.e., 204) of the home screen presentation 200 of FIG. 2. FIG. 5 shows a representative next presentation 230 that is displayed on the display screen 340 after selection and activation events for the upper left corner icon (i.e., 201) of the home screen presentation 200 of FIG. 2. Thus, FIGS. 3 and 4 show related alternate presentations 220, 230 that would result from icons 201, 204 having other positions in the original layout of icons in the home screen presentation 200 and having then been displaced according to the method of the present invention.

Furthermore, in the present invention, a means of input 310, such as depressing a particular hardware key, in the case of available hardware keys, or clicking a specific icon in the case of a touchscreen, or the use of a gesture in a gesture-based interface, may be provided for the user in order to reverse the above transitions, that is, to transition from the above next presentations 210, 220, 230 as shown in FIGS. 3-5, back to the original home screen presentation 200 of FIG. 2.

According to one embodiment, a switching function is provided for switching between content 251 or applications associated with one icon (e.g., the list 251 presented in the inner display area 250 in FIG. 4 and associated with icon 205) and other icons (e.g., the reduced size icons 201'-204', 206'-209' near the perimeter of the display 340 in FIG. 4). To alert the user that such a switching has taken place, the inner display area 250 (or content 251 therein) may be highlighted graphically (e.g., by a highlighted or shaded border or perimeter 252). For example, to indicate an application-level selection a highlighted boarder or perimeter 252 may be used. In contrast, a non-highlighted border or perimeter 252 may be used to indicated a content-level or detail-level selection.

In graphical user interface technology, it is often helpful to show intermediate steps over time from an initial state (e.g., 200) toward an end state (e.g., 210) for transitions caused or initiated by a user. Such animation may assist the user in understanding what has taken place through simulated motion. Such software implemented animated transitions may mimic common object displacements in reaction to forces, in the physical world, so as to provide a familiar feel to the user.

According to one embodiment, animated transitions are provided between the home screen presentation 200 and the next presentation 210, 220, 230. These animated transitions may include temporary display of both intermediate icon or object sizes and intermediate icon or object positions, in discrete steps, progressing from the home screen presentation 200 toward the next presentation 210, 220, 230. Graphics techniques such as the use of an undisplayed buffer memory area or double buffer may be employed to give the user the impression of a smooth transition between initial 200 and final states 210, 220, 230.

In the transitions from the home screen presentation 200 to the next presentation 210, 220, 230 as described above, a simple two level hierarchy of information is presented, those levels being the coarse view of the home screen presentation 200 and the detailed view of the inner display area 250 in the next presentation 210, 220, 230. However, according to one embodiment, the hierarchy need not be limited to two levels. For example, according to one embodiment, it can be extended to a multi-level hierarchy (e.g., file browsing in the case of nested folders) through the use of additional user input to proceed deeper into the hierarchy and through the use of graphical representations (e.g., additional border frames, color or greyscale or textured shading, or specialized icons) to show the presence of other levels in the hierarchy that can be selected.

According to one embodiment, magnification may be applied to the inner display area 250 shown in FIGS. 3-5. According to another embodiment, an inset magnifier may be applied to the inner display area 250 shown in FIGS. 3-5. According to another embodiment, a detail-in-context lens 410 may be applied to the inner display area 250 shown in FIGS. 3-5. In these embodiments, the inner display area 250 (or both the inner and outer display areas 250, 260) may be considered as the region-of-interest.

Figure 6:
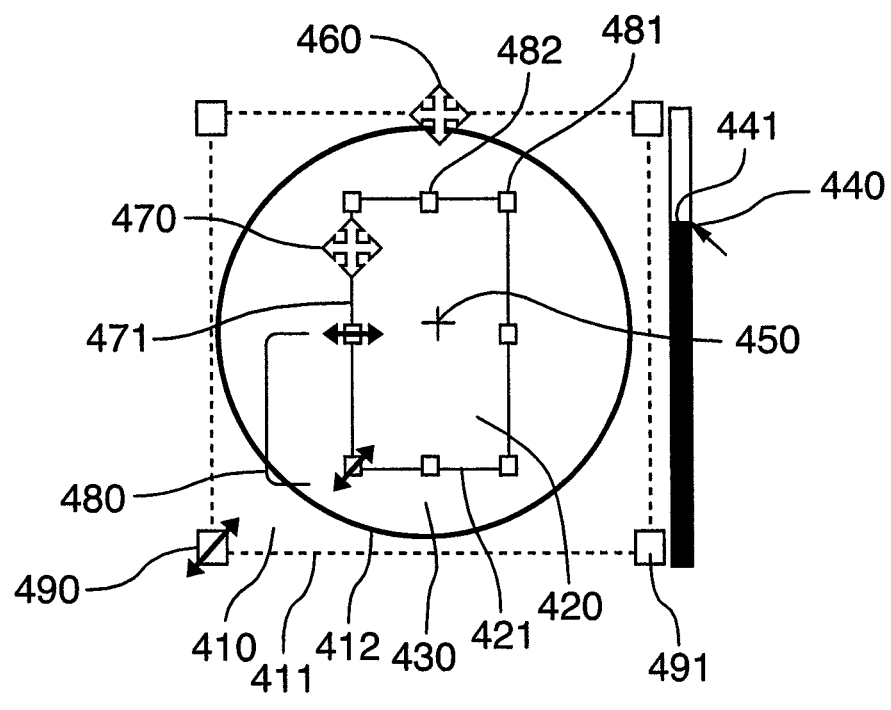
FIG. 6 is a partial screen capture illustrating a graphical user interface having lens control elements for adjusting detail-in-context presentations in accordance with an embodiment of the invention; and, FIG. 7 is a flow chart illustrating operations of modules within a data processing system for presenting applications on a display screen, in accordance with an embodiment of the invention.
Figure 6:
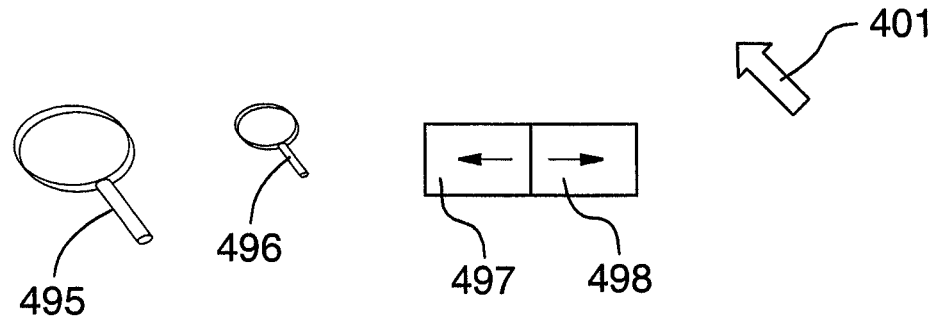

With respect to the application of a detail-in-context lens 410 to the inner display area 250, consider FIG. 6. FIG. 6 is a partial screen capture illustrating a GUI 400 having lens control elements for adjusting detail-in-context presentations in accordance with an embodiment of the invention. The lens control elements of the GUI 400 are adjusted by the user via an input device 310 to control the characteristics of the lens 410 (shown after projection in FIG. 6) used to generate the detail-in-context presentation. Using the input device 310 (e.g., a mouse), a user adjusts parameters of the lens 410 using icons and scroll bars of the GUI 400 that are displayed over the magnified and compressed regions 420, 430 on the display screen 340. Signals representing input device 310 movements and selections are transmitted to the CPU 320 of the data processing system 300 where they are translated into instructions for lens control.

The lens 410 (shown after projection in FIG. 6) includes a focal region 420 (shown after projection in FIG. 6) which produces a magnified region 420 after projection at least partially surrounded by a shoulder region 430 (shown after projection in FIG. 6) which produces an at least partially compressed region 430 after projection. In FIG. 6, the lens 410 is shown with a rectangular shaped focal region 420 lying near the center of the lens 410 and with a circular shaped shoulder region 430 surrounding the focal region 420. However, the lens 410 and its focal and shoulder regions 420, 430 may have any desired shape (e.g., square, rectangular, circular, etc.).

The GUI 400 may include the following lens control elements: move, pickup, resize shoulder region, resize focal region, fold, magnify, zoom, and scoop. Each of these lens control elements may have at least one lens control icon or alternate cursor icon associated with it. In general, when a lens 410 is selected by a user through a point and click operation, the following lens control icons may be displayed over the lens 410: pickup icon 450, lens outline icon 412, shoulder region bounding rectangle icon 411, focal region bounding rectangle icon 421, handle icons 481, 482, 491, magnify slide bar icon 440, zoom icon 495, and scoop slide bar icon (not shown). Typically, these icons are displayed simultaneously after selection of the lens 410. In addition, when the cursor 401 is located within the extent of a selected lens 410, an alternate cursor icon 460, 470, 480, 490, 495 may be displayed over the lens 410 to replace the cursor 401 or may be displayed in combination with the cursor 401. These lens control elements, corresponding icons, and their effects on the characteristics of a lens 410 are described below with reference to FIG. 6.

In general, when a lens 410 is selected by a point and click operation, bounding rectangle icons 411, 421 are displayed surrounding the focal region 420 and shoulder region 430 of the selected lens 410 to indicate that the lens 410 has been selected. With respect to the bounding rectangles 411, 421 one might view them as glass windows enclosing the focal region 420 and the shoulder region 430, respectively. The bounding rectangles 411, 421 include handle icons 481, 482, 491 allowing for direct manipulation of the focal region 420 and the shoulder region 430 as will be explained below. Thus, the bounding rectangles 411, 421 not only inform the user that the lens 410 has been selected, but also provide the user with indications as to what manipulation operations might be possible for the selected lens 410 though use of the displayed handles 481, 482, 491. Note that the bounding rectangle 411, 421 may be of any shape.

Moreover, the cursor 401 provides a visual cue indicating the nature of an available lens control element. As such, the cursor 401 will generally change in form by simply pointing to a different lens control icon 450, 412, 411, 421, 481, 482, 491, 440. For example, when resizing the shoulder region 430 of a lens 410 using a corner handle 491, the cursor 401 may change form to a resize icon 490 once it is pointed at (i.e., positioned over) the corner handle 491. The cursor 401 may remain in the form of the resize icon 490 until the cursor 401 has been moved away from the corner handle 491.

Lateral movement of a lens 410 is provided by the move lens control element of the GUI 400. This functionality is accomplished by the user first selecting the lens 410 through a point and click operation. Then, the user points to a point within the lens 410 that is other than a point lying on a lens control icon 450, 412, 411, 421, 481, 482, 491, 440. When the cursor 401 is so located, a move icon 460 is displayed over the lens 410 to replace the cursor 401 or may be displayed in combination with the cursor 401. The move icon 460 not only informs the user that the lens 410 may be moved, but also provides the user with indications as to what movement operations are possible for the selected lens 410. For example, the move icon 460 may include arrowheads indicating up, down, left, and right motion. Next, the lens 410 is moved by a click and drag operation in which the user clicks and drags the lens 410 to the desired position on the screen 340 and then releases the mouse button 310. The lens 410 is locked in its new position until a further pickup and move operation is performed.

Lateral movement of a lens 410 is also provided by the pickup lens control element of the GUI 400. This functionality is accomplished by the user first selecting the lens 410 through a point and click operation. As mentioned above, when the lens 410 is selected a pickup icon 450 is displayed over the lens 410 near the centre of the lens 410. Typically, the pickup icon 450 will be a crosshairs. In addition, a lens outline icon 412 is displayed over the lens 410 representing the perimeter of the lens 410 (i.e., the perimeter of the shoulder region 430). The crosshairs 450 and lens outline 412 not only inform the user that the lens has been selected, but also provides the user with an indication as to the pickup operation that is possible for the selected lens 410. Next, the user points at the crosshairs 450 with the cursor 401. Then, the lens outline 412 is moved by a click and drag operation in which the user clicks and drags the crosshairs 450 to the desired position on the screen 340 and then releases the mouse button 310. The full lens 410 is then moved to the new position and is locked there until a further pickup operation is performed. In contrast to the move operation described above, with the pickup operation, it is the lens outline 412 that the user repositions rather than the full lens 410.

Resizing of the shoulder region 430 of a lens 410 is provided by the resize shoulder region lens control element of the GUI. After the lens 410 is selected, a bounding rectangle icon 411 is displayed surrounding the shoulder region 430. For a rectangular shaped shoulder region 430, the bounding rectangle icon 411 may be coextensive with the perimeter of the shoulder region 430. The bounding rectangle 411 includes handles 491. These handles 491 can be used to stretch the shoulder region 430 taller or shorter, wider or narrower, or proportionally larger or smaller. The corner handles 491 will keep the proportions the same while changing the size. The middle handles (not shown) will make the shoulder region 430 taller or shorter, wider or narrower. Resizing the shoulder region 430 by the corner handles 491 will keep the shoulder region 430 in proportion. Resizing the shoulder region 430 by the middle handles will change the proportions of the shoulder region 430. That is, the middle handles change the aspect ratio of the shoulder region 430 (i.e., the ratio between the height and the width of the bounding rectangle 411 of the shoulder region 430). When a user points at a handle 491 with the cursor 401 a resize icon 490 may be displayed over the handle 491 to replace the cursor 401 or may be displayed in combination with the cursor 401. The resize icon 490 not only informs the user that the handle 491 may be selected, but also provides the user with indications as to the resizing operations that are possible with the selected handle. For example, the resize icon 490 for a corner handle 491 may include arrows indicating proportional resizing. The resize icon (not shown) for a middle handle may include arrows indicating width resizing or height resizing. After pointing at the desired handle 491 the user would click and drag the handle 491 until the desired shape and size for the shoulder region 430 is reached. Once the desired shape and size are reached, the user would release the mouse button 310. The shoulder region 430 of the lens 410 is then locked in its new size and shape until a further resize shoulder region operation is performed.

Resizing of the focal region 420 of a lens 410 is provided by the resize focal region lens control element of the GUI. After the lens 410 is selected, a bounding rectangle icon 421 is displayed surrounding the focal region 420. For a rectangular shaped focal region 420, the bounding rectangle icon 421 may be coextensive with the perimeter of the focal region 420. The bounding rectangle 421 includes handles 481, 482. These handles 481, 482 can be used to stretch the focal region 420 taller or shorter, wider or narrower, or proportionally larger or smaller. The corner handles 481 will keep the proportions the same while changing the size. The middle handles 482 will make the focal region 420 taller or shorter, wider or narrower. Resizing the focal region 420 by the corner handles 481 will keep the focal region 420 in proportion. Resizing the focal region 420 by the middle handles 482 will change the proportions of the focal region 420. That is, the middle handles 482 change the aspect ratio of the focal region 420 (i.e., the ratio between the height and the width of the bounding rectangle 421 of the focal region 420). When a user points at a handle 481, 482 with the cursor 401 a resize icon 480 may be displayed over the handle 481, 482 to replace the cursor 401 or may be displayed in combination with the cursor 401. The resize icon 480 not only informs the user that a handle 481, 482 may be selected, but also provides the user with indications as to the resizing operations that are possible with the selected handle. For example, the resize icon 480 for a corner handle 481 may include arrows indicating proportional resizing. The resize icon 480 for a middle handle 482 may include arrows indicating width resizing or height resizing. After pointing at the desired handle 481, 482, the user would click and drag the handle 481, 482 until the desired shape and size for the focal region 420 is reached. Once the desired shape and size are reached, the user would release the mouse button 310. The focal region 420 is then locked in its new size and shape until a further focus resize operation is performed.

Folding of the focal region 420 of a lens 410 is provided by the fold control element of the GUI. In general, control of the degree and direction of folding is accomplished by a click and drag operation on a point 471, other than a handle 481, 482, on the bounding rectangle 421 surrounding the focal region 420. The direction of folding is determined by the direction in which the point 471 is dragged. The degree of folding is determined by the magnitude of the translation of the cursor 401 during the drag. In general, the direction and degree of folding corresponds to the relative displacement of the focal region 420 with respect to the shoulder region 430. In particular, after the lens 410 is selected, a bounding rectangle icon 421 is displayed surrounding the focal region 420. The bounding rectangle 421 includes handles 481, 482. When a user points at a point 471, other than a handle 481, 482, on the bounding rectangle 421 surrounding the focal region 420 with the cursor 401, a fold icon 470 may be displayed over the point 471 to replace the cursor 401 or may be displayed in combination with the cursor 401. The fold icon 470 not only informs the user that a point 471 on the bounding rectangle 421 may be selected, but also provides the user with indications as to what fold operations are possible. For example, the fold icon 470 may include arrowheads indicating up, down, left, and right motion. By choosing a point 471, other than a handle 481, 482, on the bounding rectangle 421 a user may control the degree and direction of folding. To control the direction of folding, the user would click on the point 471 and drag in the desired direction of folding. To control the degree of folding, the user would drag to a greater or lesser degree in the desired direction of folding. Once the desired direction and degree of folding is reached, the user would release the mouse button 310. The lens 410 is then locked with the selected fold until a further fold operation is performed.

Magnification (i.e., elevation) of the lens 410 is provided by the magnify lens control element of the GUI. After the lens 410 is selected, the magnify control is presented to the user as a slide bar icon 440 near or adjacent to the lens 410 and typically to one side of the lens 410. Sliding the bar 441 of the slide bar 440 results in a proportional change in the magnification of the lens 410. The slide bar 440 not only informs the user that magnification of the lens 410 may be selected, but also provides the user with an indication as to what level of magnification is possible. The slide bar 440 includes a bar 441 that may be slid up and down, or left and right, to adjust and indicate the level of magnification. To control the level of magnification, the user would click on the bar 441 of the slide bar 440 and drag in the direction of desired magnification level. Once the desired level of magnification is reached, the user would release the mouse button 310. The lens 410 is then locked with the selected magnification until a further magnification operation is performed. In general, the focal region 420 is an area of the lens 410 having constant magnification (e.g., for a focal region 420 that is the flat rectangular top of a lens having a truncated pyramid shape). Magnification of the focal region 420 varies inversely with the distance from the focal region 420 to the view plane. Magnification of areas lying in the shoulder region 430 of the lens 410 also varies inversely with their distance from the view plane. Thus, magnification of areas lying in the shoulder region 430 will range from unity at the perimeter (e.g., 412) of the shoulder region 430 to the level of magnification of the focal region 420 (e.g., for a shoulder region 430 that comprises the four inclined trapezoidal sides of a lens having a truncated pyramid shape).

Zoom functionality is provided by the zoom lens control element of the GUI. The zoom lens control element allows a user to quickly navigate to a region-of-interest within an original image and then zoom in to that region-of-interest for detailed viewing or editing. Referring to FIG. 6, the combined presentation area covered by the focal region 420 and shoulder region 430 may be referred to as the "extent of the lens". Similarly, the presentation area covered by the focal region 420 may be referred to as the "extent of the focal region". The extent of the lens may be indicated to a user by a shoulder region bounding rectangle 411 when the lens 410 is selected. The extent of the lens may also be indicated by an arbitrarily shaped figure that bounds or is coincident with the perimeter (e.g., 412) of the shoulder region 430. Similarly, the extent of the focal region may be indicated by a focal region bounding rectangle 421 or arbitrarily shaped figure. The zoom lens control element allows a user to: (a) "zoom in" to the extent of the focal region such that the extent of the focal region fills the display screen 340 (i.e., "zoom to focal region extent"); (b) "zoom in" to the extent of the lens such that the extent of the lens fills the display screen 340 (i.e., "zoom to lens extent"); or, (c) "zoom in" to the area lying outside of the extent of the focal region such that the area without the focal region is magnified to the same level as the extent of the focal region (i.e., "zoom to scale").

In particular, after the lens 410 is selected, a bounding rectangle icon 411 is displayed surrounding the shoulder region 430 and a bounding rectangle icon 421 is displayed surrounding the focal region 420. Zoom functionality is accomplished by the user first selecting the zoom icon 495 through a point and click operation When a user selects zoom functionality, a zoom cursor icon 496 may be displayed to replace the cursor 401 or may be displayed in combination with the cursor 401. The zoom cursor icon 496 provides the user with indications as to what zoom operations are possible. For example, the zoom cursor icon 496 may include a magnifying glass. By choosing a point within the extent of the focal region, within the extent of the lens, or without the extent of the lens, the user may control the zoom function. To zoom in to the extent of the focal region such that the extent of the focal region fills the display screen 340 (i.e., "zoom to focal region extent"), the user would point and click within the extent of the focal region. To zoom in to the extent of the lens such that the extent of the lens fills the display screen 340 (i.e., "zoom to lens extent"), the user would point and click within the extent of the lens. Or, to zoom in to the presentation area without the extent of the focal region, such that the area without the extent of the focal region is magnified to the same level as the extent of the focal region (i.e., "zoom to scale"), the user would point and click without the extent of the lens. After the point and click operation is complete, the presentation is locked with the selected zoom until a further zoom operation is performed.

Alternatively, rather than choosing a point within the extent of the focal region, within the extent of the lens, or without the extent of the lens to select the zoom function, a zoom function menu with multiple items (not shown) or multiple zoom function icons (not shown) may be used for zoom function selection. The zoom function menu may be presented as a pull-down menu. The zoom function icons may be presented in a toolbar or adjacent to the lens 410 when the lens is selected. Individual zoom function menu items or zoom function icons may be provided for each of the "zoom to focal region extent", "zoom to lens extent", and "zoom to scale" functions described above. In this alternative, after the lens 410 is selected, a bounding rectangle icon 411 may be displayed surrounding the shoulder region 430 and a bounding rectangle icon 421 may be displayed surrounding the focal region 420. Zoom functionality is accomplished by the user selecting a zoom function from the zoom function menu or via the zoom function icons using a point and click operation. In this way, a zoom function may be selected without considering the position of the cursor 401 within the lens 410.

The concavity or "scoop" of the shoulder region 430 of the lens 410 is provided by the scoop lens control element of the GUI. After the lens 410 is selected, the scoop control is presented to the user as a slide bar icon (not shown) near or adjacent to the lens 410 and typically below the lens 410. Sliding the bar (not shown) of the slide bar results in a proportional change in the concavity or scoop of the shoulder region 430 of the lens 410. The slide bar not only informs the user that the shape of the shoulder region 430 of the lens 410 may be selected, but also provides the user with an indication as to what degree of shaping is possible. The slide bar includes a bar that may be slid left and right, or up and down, to adjust and indicate the degree of scooping. To control the degree of scooping, the user would click on the bar of the slide bar and drag in the direction of desired scooping degree. Once the desired degree of scooping is reached, the user would release the mouse button 310. The lens 410 is then locked with the selected scoop until a further scooping operation is performed.

Advantageously, a user may choose to hide one or more lens control icons 450, 412, 411, 421, 481, 482, 491, 440, 495 shown in FIG. 6 from view so as not to impede the user's view of the image within the lens 410. This may be helpful, for example, during an editing or move operation. A user may select this option through means such as a menu, toolbar, or lens property dialog box.

In addition, the GUI 400 maintains a record of control element operations such that the user may restore pre-operation presentations. This record of operations may be accessed by or presented to the user through "Undo" and "Redo" icons 497, 498, through a pull-down operation history menu (not shown), or through a toolbar.

For example, in order to view a selected region-of-interest in detail, a user can define a lens 410 over the region-of-interest using the GUI 400. The lens 410 may be introduced to the original image to form the a presentation through the use of a pull-down menu selection, tool bar icon, etc. Using lens control elements for the GUI 400, such as move, pickup, resize base, resize focus, fold, magnify, zoom, and scoop, as described above, the user adjusts the lens 410 for detailed viewing of the region-of-interest. Using the magnify lens control element, for example, the user may magnify the focal region 420 of the lens 410 to pixel quality resolution revealing detailed information pertaining to the selected region-of-interest. That is, the portion of the original image outside the extent of the lens is displayed at a low resolution while the portion of the original image within the extent of the lens is displayed at a resolution based on a user selected magnification 440, 441.

Moreover, the lens 410 may be added to the presentation before or after the region-of-interest is selected. That is, the user may first add a lens 410 to a presentation or the user may move a pre-existing lens into place over the selected region-of-interest. The lens 410 may be introduced to the original image to form the presentation through the use of a pull-down menu selection, tool bar icon, etc.

Advantageously, by using a detail-in-context lens 410, a user can view a large area (i.e., outside the extent of the lens 410) while focusing in on a smaller area (i.e., within the focal region 420 of the lens 410) including and/or surrounding the selected region-of-interest. This makes it possible for a user to view the region-of-interest in detail without losing visibility or context of the portion of the original image surrounding the region-of-interest.

Figure 7:
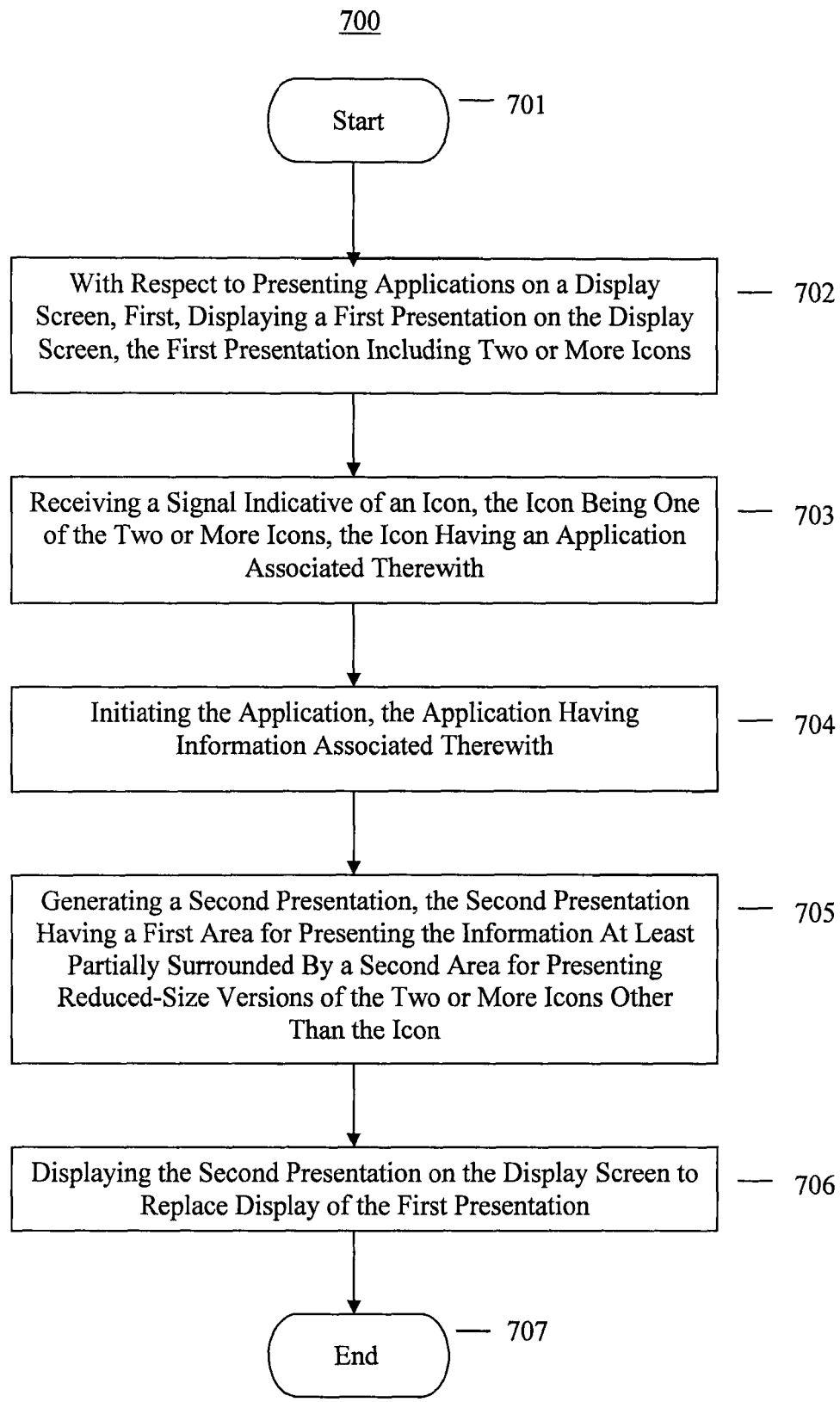

Aspects of the above described method may be summarized with the aid of a flowchart. FIG. 7 is a flow chart illustrating operations 700 of modules 321, 331 within a data processing system 300 for presenting applications on a display screen 340, in accordance with an embodiment of the invention.

At step 701, the operations 700 start.

At step 702, a first presentation 200 is displayed on the display screen 340, the first presentation 200 including two or more icons 201-209.

At step 703, a signal indicative of an icon 205 is received, the icon 205 being one of the two or more icons 201-209, the icon 205 having an application associated therewith.

At step 704, the application is initiated, the application having information (or content) 251 associated therewith.

At step 705, a second presentation (e.g., 210) is generated, the second presentation 220 having a first area 250 for presenting the information 251 at least partially surrounded by a second area 260 for presenting reduced-size versions 201'-204', 206'-209' of the two or more icons other than the icon 201-204, 206-209.

At step 706, the second presentation 210 is displayed on the display screen 340 to replace display of the first presentation 200.

At step 707, the operations 700 end.

In the above method, the generating 705 may include maintaining relative position in the second presentation 210 of the first area 250 and the reduced-size versions of the two or more icons other than the icon 201'-204', 206'-209' with respect to the icon 205 and the two or more icons other than the icon 201-204, 206-209 in the first presentation 200, respectively. The first area 250 may have a perimeter 252 and a reduced-size version 205' of the icon 205 may be presented proximate the perimeter 252 in the second presentation 210. The perimeter 252 may be rectangular in shape and the reduced-size version 205' of the icon 205 may be presented over a corner of the perimeter 252. The perimeter 252 may be high-lighted according to type of application or information 251. The displaying 706 of the second presentation 210 may include animating transition from the first presentation 200 to the second presentation 210. The content 251 may be magnified for the first area 250. The second presentation 210 may include a graphical user interface 400 for adjusting a magnification for the first area 250. The second presentation 210 may include a graphical user interface 400 for adjusting a lens 410 for the first area 250. And, the display screen 340 may be a display screen of a handheld or wireless device.

While this invention is primarily discussed as a method, a person of ordinary skill in the art will understand that the apparatus discussed above with reference to a data processing system or wireless device 300, may be programmed to enable the practice of the method of the invention. Moreover, an article of manufacture for use with a data processing system or wireless device 300, such as a pre-recorded storage device or other similar computer readable medium including program instructions recorded thereon, may direct the data processing system or wireless device 300 to facilitate the practice of the method of the invention. It is understood that such apparatus and articles of manufacture also come within the scope of the invention.

In particular, the sequences of instructions which when executed cause the method described herein to be performed by the data processing system or wireless device 300 can be contained in a data carrier product according to one embodiment of the invention. This data carrier product can be loaded into and run by the data processing system or wireless device 300. In addition, the sequences of instructions which when executed cause the method described herein to be performed by the data processing system or wireless device 300 can be contained in a computer software product according to one embodiment of the invention. This computer software product can be loaded into and run by the data processing system or wireless device 300. Moreover, the sequences of instructions which when executed cause the method described herein to be performed by the data processing system or wireless device 300 can be contained in an integrated circuit product (e.g., a hardware module or modules 321) which may include a coprocessor or memory according to one embodiment of the invention. This integrated circuit product can be installed in the data processing system or wireless device 300.

The embodiments of the invention described above are intended to be exemplary only. Those skilled in the art will understand that various modifications of detail may be made to these embodiments, all of which come within the scope of the invention.

What is claimed is:

1. A method comprising:
   causing display of a first presentation on a display screen, the first presentation including a plurality of application icons arranged in an originally-sized first display area, wherein each of the plurality of application icons corresponds to a different one of a plurality of applications;
   while causing display of the first presentation on the display screen, receiving a selection signal indicative of a selection of one of the plurality of application icons to form a selected application icon;
   in response to receiving the selection signal, initiating a selected application, which is the one of the plurality of applications that corresponds to the selected application icon;
   in response to initiating the selected application, causing display of a second presentation, wherein the second presentation includes:
   a reduced-size first display area reduced in size relative to the originally-sized first display area, wherein the reduced- size first area includes reduced-sized versions of the plurality of application icons reduced in size relative to the plurality of application icons presented in the originally- sized first display area; and a second display area that presents information of the selected application; and
   wherein the causing display of a first presentation and the causing display of a second presentation are performed to maintain a relative order of positions of two or more reduced-size versions of the plurality of application icons in the second presentation as compared to a relative order of positions of a corresponding two or more of the plurality of application icons presented in the originally-sized first display area.

2. The method of claim 1 wherein the second display area has a perimeter and a reduced-sized version of at least one of the plurality of application icons is presented proximate the perimeter in the second presentation.

3. The method of claim 2 wherein the perimeter is rectangular in shape and wherein the reduced-size version of the at least one of the plurality of application icons is presented over a corner of the perimeter.

4. The method of claim 1 further comprising animating a transition from the first presentation to the second presentation.

5. The method of claim 1 wherein information within the second display area is magnified.

6. The method of claim 1 wherein the second presentation includes a graphical user interface for adjusting a magnification for the second display area.

7. The method of claim 1 wherein the second presentation includes a graphical user interface for adjusting a lens for the second display area.

8. The method of claim 1 wherein the display screen is a display screen of a handheld or wireless device.

9. A system comprising:
a processor coupled to memory; and
modules within the memory that in response to being executed by the processor, cause the processor to cause operations to be performed comprising:
causing display of a first presentation on a display screen, the first presentation including a plurality of application icons arranged in an originally-sized first display area, wherein each of the plurality of application icons corresponds to a different one of a plurality of applications;
while causing display of the first presentation on the display screen, receiving a selection signal indicative of a selection of one of the plurality of application icons to form a selected application icon;
in response to receiving the selection signal, initiating a selected application, which is the one of the plurality of applications that corresponds to the selected application icon,
in response to initiating the selected application, causing display of a second presentation, wherein the second presentation includes:
a reduced-size first display area reduced in size relative to the originally-sized display area, wherein the reduced-size first area includes reduced-size versions of the plurality of application icons reduced in size relative to the plurality of application icons presented in the originally-sized first display area; and
a second display area that presents information of the selected application; and wherein causing display of the first presentation and causing display of the second presentation are performed to maintain a relative order of positions of two or more reduced-size versions of the plurality of application icons in the second presentation as compared to a relative order of positions of a corresponding two or more of the plurality of application icons presented in the originally- sized first display area.

10. The system of claim 9 wherein the second display area has a perimeter and a reduced-size version of at least one of the plurality of application icons is presented proximate the perimeter in the second presentation.

11. The system of claim 10 wherein the perimeter is rectangular in shape and wherein the reduced-size version of the at least one of the plurality of application icons is presented over a corner of the perimeter.

12. The system of claim 9 wherein the causing replacement with the second presentation includes an animated transition from the first presentation to the second presentation.

13. The system of claim 9 wherein the information is magnified for the second display area.

14. The system of claim 9 wherein the second presentation includes a graphical user interface configured to adjust a magnification for the second display area.

15. The system of claim 9 wherein the second presentation includes a graphical user interface configured to adjust a lens for the second display area.

16. The system of claim 9 wherein the system is a handheld or wireless device.

17. At least one non-transitory computer-readable medium including instructions executable to cause a data processing system to:
cause display of a first presentation on a display screen, the first presentation including a plurality of application icons arranged in an originally-sized first display area, wherein each of the plurality of application icons corresponds to a different one of a plurality of applications;
while causing display of the first presentation on the display screen, receive a selection signal indicative of a selection of one of the plurality of selection signal, initiate a selected application, which is the one of the plurality of
in response to initiating the selected application, causing display of a second presentation, wherein the second presentation includes:
a reduced-size first display area reduced in size relative to the originally-sized first display area, wherein the reduced- size first area includes reduced-sized versions of the plurality of application icons reduced in size relative to the plurality of application icons presented in the originally- sized first display area; and
a second display area that presents information of the selected application; and
wherein causing display of the first presentation and causing display of the second presentation are performed to maintain a relative order of positions of two or more reduced-size versions of the plurality of application icons in the second presentation as compared to a relative order of positions of a corresponding two or more of the plurality of application icons presented in the originally-sized first display area.

18. The at least one non-transitory computer-readable medium of claim 17 wherein the second display area has a perimeter and a reduced-sized version of at least one of the plurality of application icons is presented proximate the perimeter in the second presentation.

19. The at least one non-transitory computer-readable medium of claim 18 wherein the perimeter is rectangular in shape and wherein the reduced-size version of the at least one of the plurality of application icons is presented over a corner of the perimeter.

20. The at least one non-transitory computer-readable medium of claim 17 further comprising animating a transition from the first presentation to the second presentation.

21. The at least one non-transitory computer-readable medium of claim 17 wherein information within the second display area is magnified.

22. The at least one non-transitory computer-readable medium of claim 17 wherein the second presentation includes a graphical user interface for adjusting a magnification for the second display area.

23. The at least one non-transitory computer-readable medium of claim 17 wherein the second presentation includes a graphical user interface for adjusting a lens for the second display area.

24. The at least one non-transitory computer-readable medium of claim 17 wherein the display screen is a display screen of a handheld or wireless device.

* * * * *